No. 831,659. PATENTED SEPT. 25, 1906.
W. L. FENN.
VOTING MACHINE.
APPLICATION FILED SEPT. 23, 1904.

7 SHEETS—SHEET 1.

WITNESSES:
H. A. Lamb.
S. W. Atherton.

INVENTOR
Wilson L. Fenn
BY
F. M. Wooster
ATTORNEY

No. 831,659. PATENTED SEPT. 25, 1906.
W. L. FENN.
VOTING MACHINE.
APPLICATION FILED SEPT. 23, 1904.

7 SHEETS—SHEET 2.

WITNESSES:
H. A. Lamb.
S. W. Atherton.

INVENTOR
Wilson L. Fenn
BY
A. W. Wooster
ATTORNEY

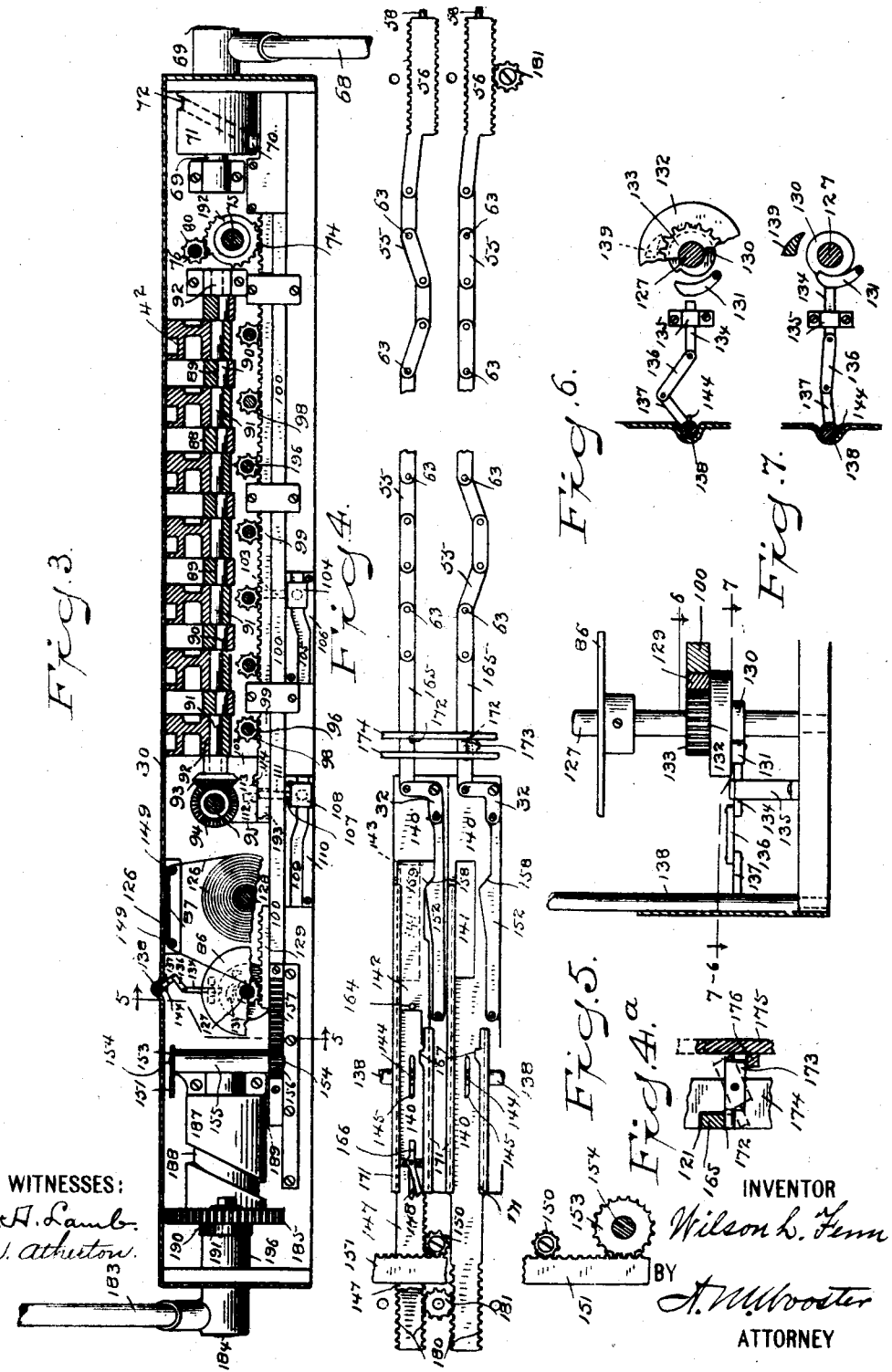

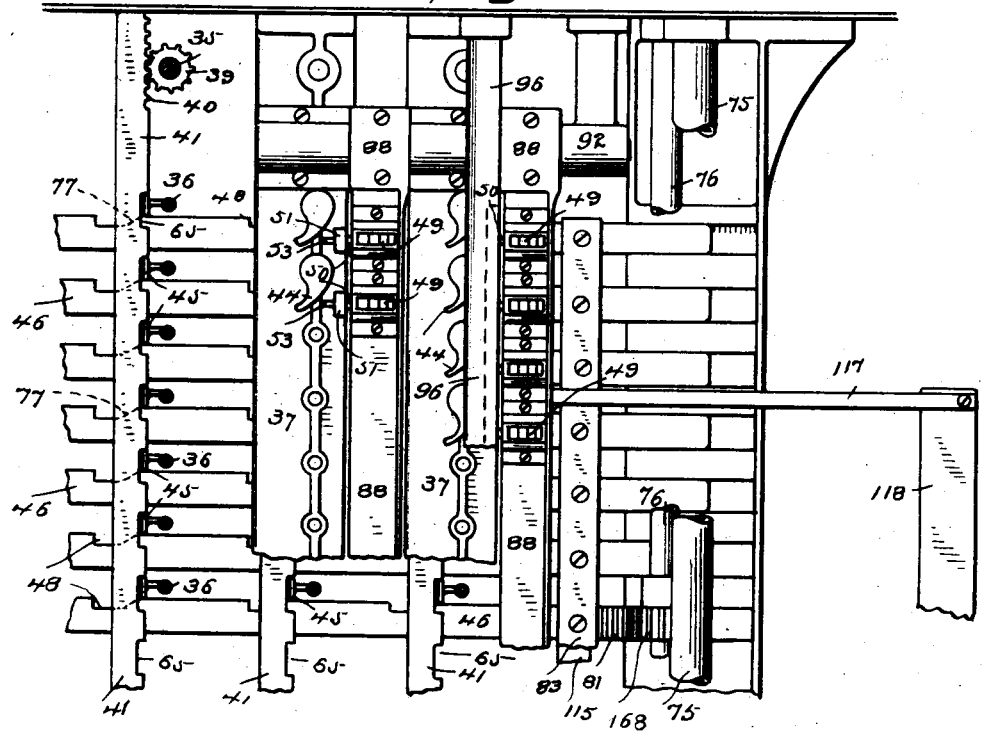

No. 831,659. PATENTED SEPT. 25, 1906.
W. L. FENN.
VOTING MACHINE.
APPLICATION FILED SEPT. 23, 1904.

7 SHEETS—SHEET 5.

WITNESSES:
H. A. Lamb.
S. W. Atherton.

INVENTOR
Wilson L. Fenn
BY
A. M. Wooster
ATTORNEY

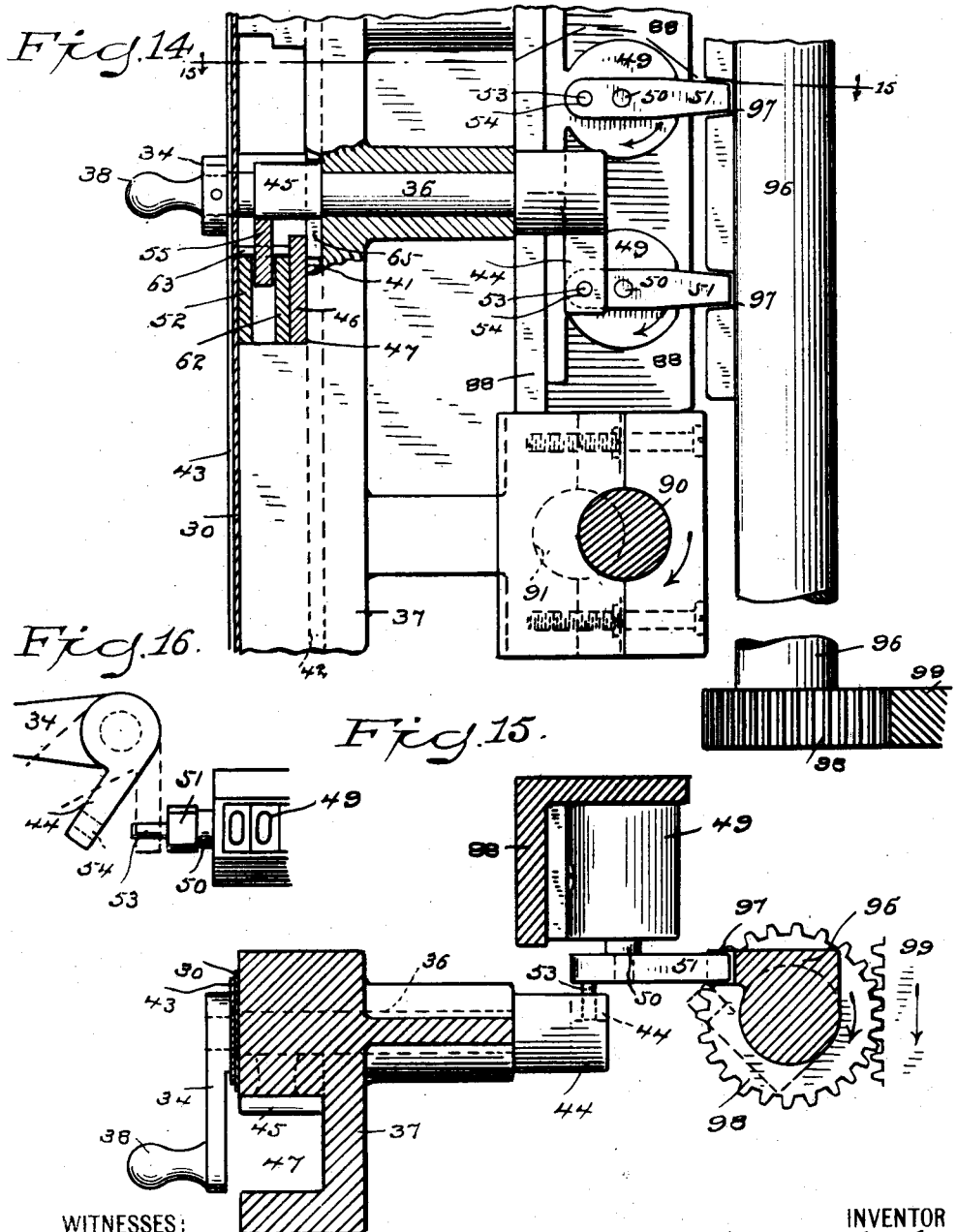

No. 831,659. PATENTED SEPT. 25, 1906.
W. L. FENN.
VOTING MACHINE.
APPLICATION FILED SEPT. 23, 1904.
7 SHEETS—SHEET 7.
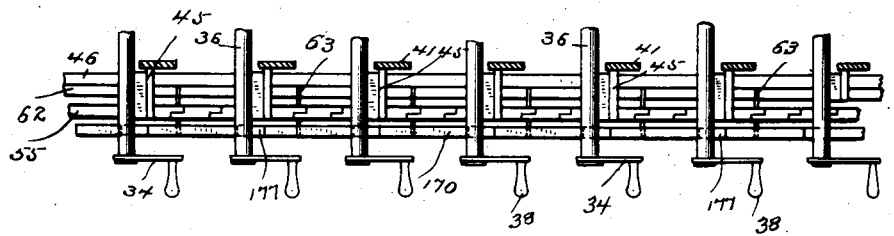
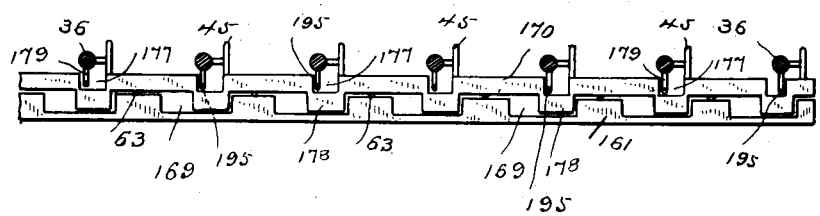
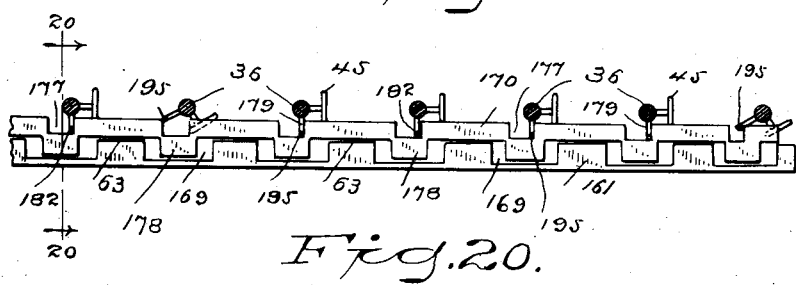
WITNESSES
H. A. Lamb.
S. W. Atherton.
INVENTOR
Wilson L. Fenn
BY
A. M. Wooster
ATTORNEY

UNITED STATES PATENT OFFICE.

WILSON L. FENN, OF HARTFORD, CONNECTICUT, ASSIGNOR TO TRIUMPH VOTING MACHINE COMPANY, A CORPORATION OF NEW JERSEY.

VOTING-MACHINE.

No. 831,659. Specification of Letters Patent. Patented Sept. 25, 1906.

Application filed September 23, 1904. Serial No. 225,637.

*To all whom it may concern:*

Be it known that I, WILSON L. FENN, a citizen of the United States, residing at Hartford, in the county of Hartford and State of Connecticut, have invented certain new and useful Improvements in Voting-Machines, of which the following is a specification, reference being had to the accompanying drawings as forming part of said specification.

This invention has for its object to provide a simple, durable, rapid, and thoroughly reliable voting-machine that will comply with the voting laws of all the States, will permit the voter to vote a full, partial, straight, or split ticket, and will permit restricted, independent, or group voting, will permit, in brief, as full and complete an expression of the voter's will as can be given by a plurality of ballots or by a blanket-ballot, that will insure the registration of every vote cast, will effectually prevent any changes in votes once registered or any tampering whatever with the returns, and will be practically impossible to get out of repair in use.

With these and other objects in view I have devised the novel voting-machine of which the following description, in connection with the accompanying drawings, is a specification, corresponding reference - numerals indicating the same parts in the several figures of the drawings.

Figure 1:
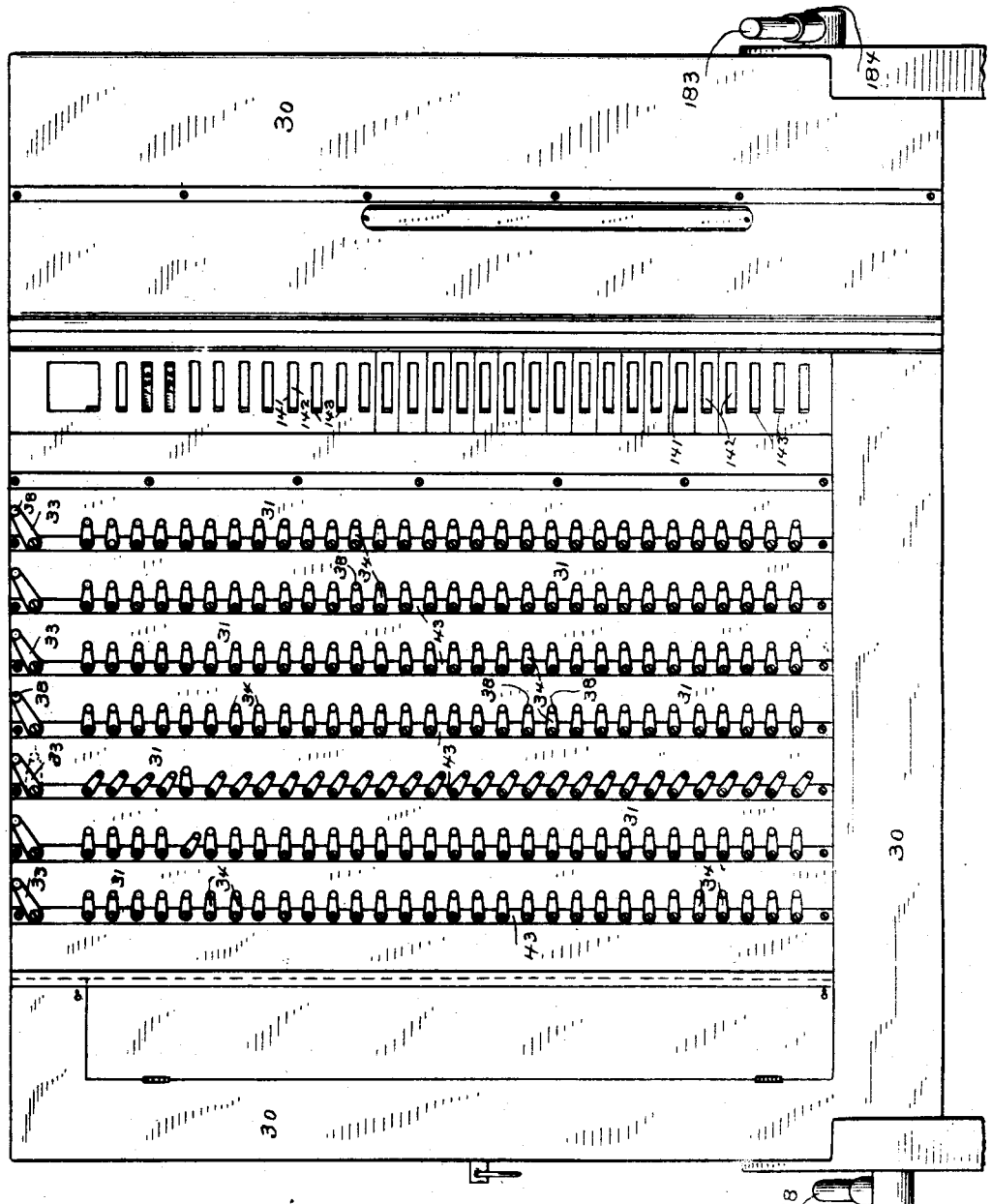
Figure 2:
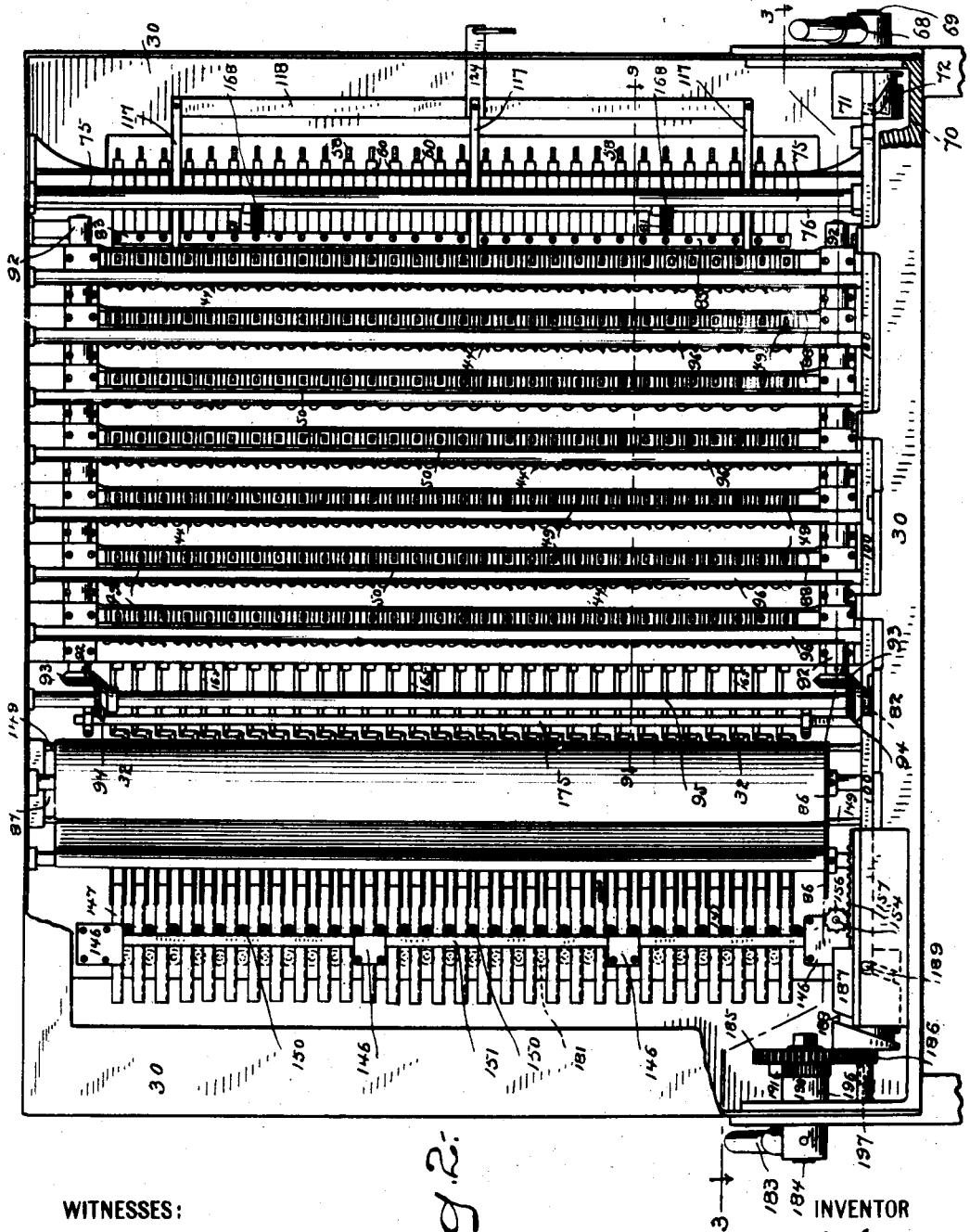
Figure 11:
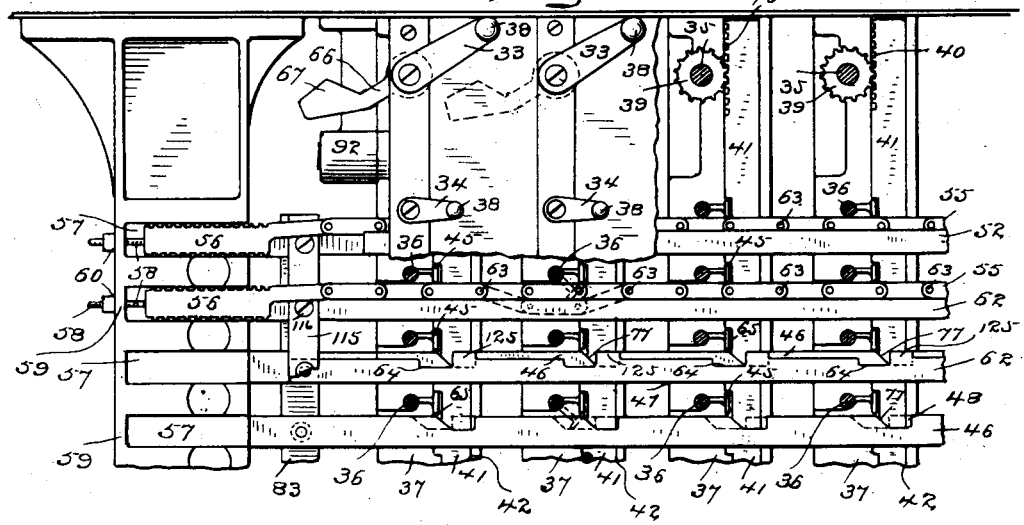
Figure 12:
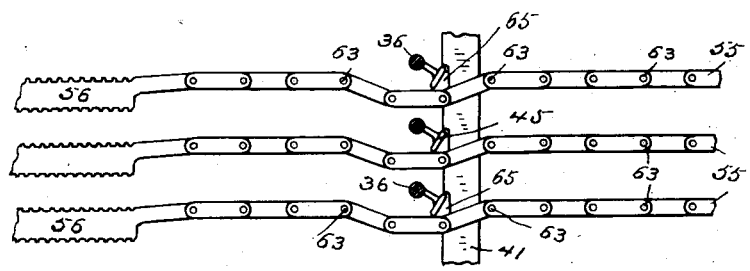
Figure 13:
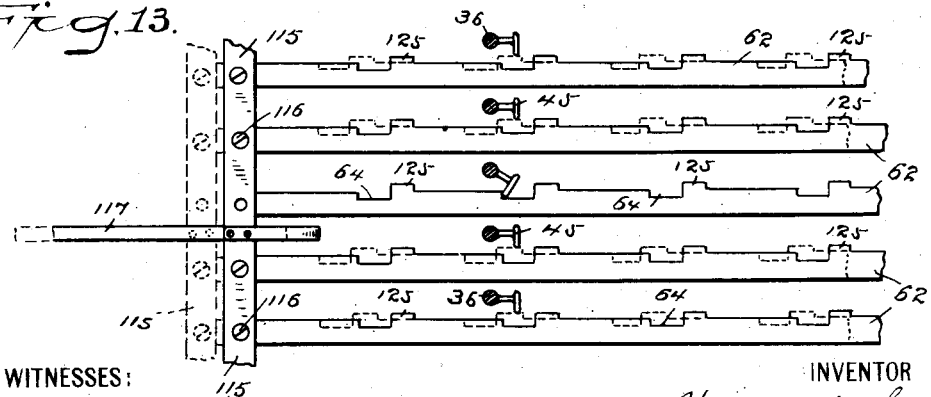

Figure 1 is a front elevation of the machine complete, illustrating the operation of voting, the individual levers in all except the second and third columns being in the non-voting position, all of the individual levers in the third column being in the voting position except the fifth, and all of the individual levers in the second column being in the non-voting position except the fifth, the fifth individual levers in the second and third columns indicating a split from a straight-party vote; Fig. 2, a rear elevation of the machine complete, the doors being removed and portions of the case broken away to show parts concealed thereby, the position of the parts corresponding with Fig. 1; Fig. 3, a horizontal section on the line 3 3 in Fig. 2 looking down, the supply paper-roll and the lower flange of the receiving paper-roll for the independent-voting sheet being partly broken away; Fig. 4, a detail view, on an enlarged scale, illustrating the mode of coupling two chains together and also illustrating a shutter-locking device operative in independent voting, the upper shutter illustrated being in the locked position and the lower shutter removed; Fig. 4ª, a detail sectional view, on an enlarged scale, illustrating one of the chain-locking latches used in independent voting; Fig. 5, an enlarged detail sectional view on the line 5 5 in Fig. 3 looking toward the right, illustrating the mechanism for rotating the receiving-roller upon which the independent-voting sheet is wound after votes have been written thereon; Fig. 6, a detail sectional view on the line 6 6 in Fig. 5 looking down; Fig. 7, a detail sectional view on the line 7 7 in Fig. 5 looking down, showing a changed position of the parts in independent voting; Fig. 8, an enlarged detail rear elevation, partly broken away, illustrating a position of the parts when the voting-levers are locked in the non-voting position by means of the locking-lugs and wedge-bars, as before the entrance-lever has been operated; Fig. 9, an enlarged detail sectional view on the line 9 9 in Fig. 2 looking down, illustrating the connection between the entrance-rack and one of the wedge-bars, the eccentric-shaft being omitted; Fig. 10, a detail view illustrating the mechanism for actuating the vertical slide which operates the chain-locking latches in independent voting; Fig. 11, an enlarged detail front elevation, partly broken away, illustrating the operation of the wedge-bars and vote-restricting bars and also showing weights which may or may not be used to return the party-levers to their normal position after they have been operated, the voting-levers and locking-dogs being shown in full lines in the locked position, as before the entrance-lever has been operated, and the position of a chain and locking-dogs after the entrance-lever has been operated being indicated by dotted lines; Fig. 12, an enlarged detail view illustrating the operation of the locking-dogs upon the chains, as in straight party voting; Fig. 13, an enlarged detail view illustrating the operation of the restricting-bars when arranged for restricted voting; Fig. 14, a greatly-enlarged detail view, partly in section, illustrating the operation of the counter operating and locking mechanisms and also showing the relative positions of the chains, supporting-bars, restricting-bars, and wedge-bars; Fig. 15, a section on the line 15 15 in Fig. 14 looking down; Fig. 16, a detail view looking from the right in Fig. 14, showing a counter-locking dog engaged with and disengaged from one of the counters; Fig. 17, a detail plan view of the chain, wedge-bar, and restricting-bar and showing the use of a bar which may be substituted for the supporting-bar when a candidate has received a plurality of nominations; Figs. 18 and 19, detail elevations showing the position of the substituted bar and a supplemental sliding bar in different positions in casting a single vote for a candidate having a plurality of nominations, and Fig. 20 is an enlarged detail cross-section on the line 20 20 in Fig. 19 looking toward the right.

30 denotes the case, which may be made up of any convenient number of parts riveted or otherwise rigidly secured together. The back of the case is closed by means of suitable doors. (Not shown in the drawings.)

Turning now to the front of the machine, (see Fig. 1 in connection with Fig. 11,) 33 denotes straight-party-voting levers, which for convenience I shall term "party-levers," and 34 individual voting-levers, which for convenience I shall term "individual" levers. The party-levers are rigidly secured to the outer ends of party-lever shafts 35, and the individual levers are rigidly secured to the outer ends of individual-lever shafts 36. Both the party and individual lever shafts are mounted to oscillate in standards 37, which are rigidly secured in the case. All of the voting-levers, both party and individual, are shown as provided with finger-pieces 38 for convenience in manipulation. Each party-lever shaft carries a pinion 39, which engages a rack 40 on a straight-party bar 41. These straight-party bars are adapted to reciprocate vertically in ways 42 in the standards.

In the present instance I have illustrated a machine provided with seven standards, seven party-levers, and seven columns of individual levers in vertical arrangement, with thirty individual levers in each column. The present machine, therefore, provides for seven party-tickets, all or any number of which may be placed in nomination, and for thirty names, should as many be required, upon each party-ticket, all or any number of which may be voted for. The machine may of course without change of principle by built to provide for a still greater number of party-tickets or a still greater number of names upon each ticket.

The names of the candidates of each party may be printed on long strips headed by the party emblems, or the names may be printed on independent slips. These strips or slips are placed in spaces 31, each name being placed in horizontal alinement with an individual lever and the strips being held in place by having their ends passed under the edges of vertical retaining-strips 43, the names of all the candidates for the same office being placed in a horizontal line with the name of each candidate under the proper party emblem—that is to say, the names of all the candidates of each party are placed in vertical columns and the names of all the candidates for each office are placed in horizontal lines. The machine is adapted to be set up for any of the different arrangements of the names of candidates that may be called for by the voting laws of the different States. The retaining-strips 43 serve to clearly separate the columns of candidates from each other.

Each individual-lever shaft 36 has rigidly secured to its inner end a counter-dog 44, the operation of which will presently be explained, and intermediate the counter-dog and the corresponding voting-lever 34 is a chain-engaging projection—in the present instance a locking-lug 45—which is adapted to engage its corresponding notch 48 in a horizontally-sliding bar 46, which I term a "re-setting-slide" or "wedge-bar." The number of wedge-bars corresponds, of course, with the number of individual levers in the party-columns. The wedge-bars slide in ways 47 in the lever-standards, and each wedge-bar is provided with seven notches 48, corresponding with the locking-lugs 45 upon the seven individual-lever shafts in each horizontal line. The operative end of each notch 48 is an incline 77, up which the corresponding locking-lug 45 to reset the voting-shafts rides when the wedge-bars are moved toward the right by operation of the exit-lever, as will presently be fully explained.

Turning now to Fig. 2, (which see in connection with Figs. 8, 14, 15, and 16,) 49 denotes the counters, which are positive in action, and 50 the counter-shafts, each of which projects from one end of a counter-case and has rigidly secured thereto a counter-lever 51. Each counter-lever 51 has projecting from its outer side and out of alinement with shaft 50 a pin 53, which is adapted to pass into a hole 54 in the corresponding counter-dog 44 when the corresponding individual lever is in the voting position.

Having described the operation of the individual levers and counter-dogs prior to the operation of counting, I will pass to other parts of the machine and will later describe the operation of counting.

55 denotes flexible members—in the present instance chains—which extend horizontally of the machine and which I term "controlling-chains." These chains correspond in number with the offices that may be voted for—thirty in the present instance. The right end of each chain as it would appear if visible in Fig. 1, the left end if visible in Fig. 2, is pivoted to a bell-crank lever 32, (see Fig. 4,) which forms a portion of the shutter-locking mechanism used in independent voting, presently to be described. The opposite end of each chain is pivoted to a double coupling-rack 56, which is adapted to slide horizontally in a way 57 in the end standard 59. (See Fig. 11.) At the outer end of each coupling-rack is an adjusting-rod 58, which passes through standard 59 and is threaded to receive an adjusting-nut 60. Each chain lies between a supporting-bar 52 and a restricting-bar 62, presently to be described, said chains, supporting-bars, restricting-bars, and wedge-bars 46 being supported horizontally in the ways 47 in the lever-standards. (See Fig. 14.) Each third chain-link rivet (indicated by 63) extends outward on opposite sides of the chain, the opposite ends of said rivets resting on the corresponding supporting-bar and restricting-bar, respectively. (See Figs. 9 and 14.) The intermediate links of the chain are flush-riveted, leaving the chain free to move between the supporting-bar and the restricting-bar. The function of the chains is to prevent illegal voting by rendering it impossible to vote for but one candidate for any office. In setting up the machine the chains are so adjusted by means of the adjusting-nuts as to give just sufficient slack to each chain to permit the operation of one voting-lever in each horizontal line. By the term "chain" I do not limit myself to a device composed of a series of links pivoted together, since any flexible member that is the equivalent of a chain might serve the same purpose and would be within the scope of my invention. The normal position of the individual levers is substantially horizontal, as indicated in Figs. 1 and 11.

The operation of voting for a single candidate consists in swinging an individual lever 34 downward from its normal position, as the fifth individual lever in the second column in Fig. 1. The movement of an individual lever oscillates the corresponding individual-lever shaft and swings the corresponding locking-lug 45 from the position of the first, second, fourth, and fifth locking-lugs in Fig. 13 to the position of the third locking-lug in said figure, (see also Figs. 4 and 12, which show the effect of the operation of locking-lugs upon the corresponding chains,) the portion of the chain engaged by a locking-lug being moved out of alinement, taking the slack out and placing a bulge in the chain at that point. When a locking-lug 45 is swung downward as just described, it passes into one of the notches 48 in the corresponding wedge-bar 46 and also into a notch 64 in the corresponding vote-restricting bar 62. It must be borne in mind that the slack in each chain is only just sufficient to permit one individual lever in that horizontal line to be operated, the operation of any individual lever taking up the slack in the portion of the chain contiguous thereto. Should any other individual lever in the same horizontal line be operated, it would simply take the bulge out of the chain in one place and put it in another place, and in so doing it would necessarily return the individual lever previously operated to its normal position. The effect, therefore, of operating a second individual lever in a horizontal line in which an individual lever has already been operated is to "unvote"—that is, to nullify the vote made by the operation of the first individual lever. This is an important feature of the machine, as it makes voting for two candidates for the same office absolutely impossible.

*Straight party voting.*—Each straight party-bar 41 is provided with notches 65, which receive the locking-lugs 45 on the individual-lever shafts. (See Fig. 12.) The upper ends of these notches are horizontal and bear upon the upper ends of the locking-lugs. When a party-lever is operated, the pinion 39 on the corresponding party-lever 35, through its engagement with the rack 40 on the corresponding party-bar 41, will move said party-bar downward and will simultaneously oscillate every individual-lever shaft in that column and throw the corresponding individual levers to the voting position. A single movement, therefore, of a party-lever gives a vote for every nominee of that party. Each party-lever shaft 35 is shown as provided with a radially-extending arm 66, carrying a weight 67. (See Fig. 11.) The action of this weight is to return a party-lever and the corresponding party-lever shaft and party-bar to their normal position the instant it is released by the voter, leaving, however, all of the individual levers and the corresponding individual-lever shafts, locking-lugs, and counter-dogs in the voting position. While these weights are preferably used, it should be understood that the machine is equally operative without them. It is important to note just here that the chains are equally effective in unvoting or nullifying an erroneous straight party-vote as in unvoting or nullifying erroneous individual votes. When a party-lever is operated, every individual lever in that column is operated also, and the slack in each chain is taken up by the downward pressure thereon of one of the locking-lugs 45 in that column. Should a voter vote the wrong straight party-ticket, all he has to do to correct the error is to operate the desired party-lever. The operation of a second party-lever acts to take the bulges in the chains made by the operation of the first party-lever out and put the bulges in other places in the chains, the straightening of the chains at the portions engaged by the locking-lugs in the column first voted acting to return all the locking-lugs, individual-lever shafts, and individual levers in that column to their normal or non-voting positions instantly.

It will of course be understood that it is not necessary in voting to operate any party-lever; but a voter is free to vote for as many or as few of the candidates of any of the parties as he may choose by simply operating the individual levers corresponding with the names of the candidates for whom he desires to vote. For example, suppose there are fourteen candidates to be voted for on the straight-party tickets, but that the voter desires to vote for two candidates only and those candidates the nominees of different parties. The voter would simply operate the two individual levers corresponding with the names of the candidates for whom he desired to vote.

*Split voting or scratching.*—Suppose now that a party desires to vote substantially a straight party-ticket, but to "split on" or "scratch" one or more of the nominees of that party. He first votes his straight party-ticket by operation of the proper party-lever—as, for example, in column 3 in Fig. 1. The dotted position of the straight party-lever in this column indicates its voting position and the full-line position its normal position, to which it has been returned by the weight after the straight party-ticket has been voted. The individual-levers in this column will now all be in the voting position. Let us suppose, for example, that instead of voting for the fifth nominee of his own party the voter desires to vote for the corresponding nominee in the second party-column. All he would have to do would be to operate the fifth individual lever in the second column, as clearly shown in Fig. 1, the effect of which through the operation of the corresponding chain and the corresponding individual-lever shaft and locking-lug in the third column would be to unvote or nullify his vote for the fifth candidate in the third column—that is to say, having voted a straight party-ticket, he can both nullify a vote for a candidate of that party and vote for a candidate for the same office of another party by simply operating an individual lever in another party-column, the return of an individual lever that has been operated to its normal position being automatic when any other individual lever in the same horizontal line is operated. Suppose now that instead of splitting on a candidate or candidates of his own party the voter desires to scratch a candidate, but without voting for the corresponding nominee of any other party. This operation may also be effected by a single operation for every scratch. Turning again to Fig. 1, suppose that a voter having voted the straight party-ticket in the third column desires to scratch the fifth candidate on said ticket, but without voting for the corresponding nominee of any other party. He would simply move the fifth individual lever in this column to the position in which it is shown— that is, he would move the individual lever corresponding with the name of the candidate he desires to scratch from the voting to the non-voting position, as is clearly shown. This would simply unvote or nullify the vote cast for that candidate, but would not cast a vote for any other candidate for the same office. The difference, in brief, between making a split and a scratch is that in splitting the voter operates another individual lever in the same horizontal line, which automatically returns the corresponding individual lever in his party-column to its normal position, and in scratching he merely returns the individual lever in the party-column he has voted corresponding to the name of the candidate he desires to scratch to its non-voting position by movement of that special individual lever without movement of a corresponding individual lever in any other party-column.

*The locking and unlocking of the voting-levers.*—All of the individual levers, and consequently all of the party-levers, are normally locked in the non-voting position by means of resetting-slides or wedge-bars 46, there being, as already explained, a wedge-bar corresponding with each horizontal line of individual levers. The unlocking movement of the wedge-bars to permit voting is performed by means of connections operated by a part which I term for convenience the "entrance-lever" and have indicated by 68, and the locking movement of the wedge-bars is performed by means of connections operated by a part which I term for convenience the "exit-lever" and which is indicated by 183. I will first describe the unlocking movement and the general effect of the operation of the entrance-lever and will later describe in full the effect of the operation of the exit-lever. In the normal or locking position of the wedge-bars the locking-lugs 45 on the individual-lever shafts 36 lie in engagement with the tops of the wedge-bars just past the notches 48, as clearly shown in Figs. 8 and 11. When the wedge-bars are in this position, the voting-levers are locked in the normal or non-voting position, from which position they can only be released by movement of the wedge-bars through the operation of the entrance-lever. Movement of the wedge bars to the unlocking position—that is, from the position shown in full lines in Fig. 11 to the position shown in dotted lines in said figure—places the notches 48 in the wedge-bars under the locking-lugs, thus leaving all of the voting-levers free to be operated either individually or by means of a party-lever, as already explained. The voting position of the locking-lugs is clearly shown in Fig. 12 and by the third locking-lug in Fig. 13 and is also indicated by dotted lines in Fig. 11. Returning now to Figs. 2 and 3, (in connection with which see Fig. 9,) 68 denotes the entrance-lever rigidly secured to the entrance-shaft 69, which is journaled in the end of the base and carries entrance-cam 71, having a cam-groove 72. This groove is engaged by a roller 70, carried by a pin which projects from entrance-slide 73. The entrance-slide is provided on its opposite side with a pin 84, (see dotted lines, Fig. 9,) which engages a slot 85 in entrance-rack 74. 75 denotes the wedge-bar gear-shaft, and 76 the wedge-bar pinion-shaft, both o which extend vertically from the bottom to the top of the machine and are journaled in bearings on the case. The wedge-bar gear-shaft carries a disk 192, provided on one side of its periphery with gear-teeth 78, which engage entrance-rack 74, and on the opposite side with gear-teeth 79, which engage a pinion 80 on shaft 76. Two of the wedge-bars intermediate the top and bottom of the case are provided with racks 81, (see Figs. 2 and 9,) which are engaged by pinions 168 on shaft 76 to move the wedge-bars longitudinally. The wedge-bars are connected together so as to move as one by means of a vertical bar 83, to which each wedge-bar is rigidly secured. The normal position of pin 84 on the entrance-slide at the right end of slot 85 in the entrance-rack—that is, when the wedge-bars are in the locking position—is indicated in Fig. 9. The normal position of the entrance-lever is substantially horizontal, and there can be no voting until the entrance-lever has been operated. Standing at the back of the machine, the voter first operates the entrance-lever by raising it to substantially the horizontal position, then passes around to the front of the machine, the entrance-lever being returned or allowed to return to its normal position. The raising of the entrance-lever oscillates the entrance-shaft and entrance-cam 71, which moves entrance-slide 73 toward the right, as seen in Fig. 9, and through the engagement of pin 84 with the right end of the slot in entrance-rack 74 moves said rack likewise toward the right, oscillates gear-shaft 75 and pinion-shaft 76, and through the engagement of the pinions 168 on the pinion-shaft with the racks on the wedge-bars moves the wedge-bars to the unlocking position, which has already been described. The entrance-slide is returned to its normal position by the return movement of the entrance-lever, leaving the entrance-rack, however, at its position toward the right, from which it is returned by operation of the exit-lever, as will be more fully explained.

By the terms "entrance-lever" and "exit-lever" I do not limit myself to the exact structure illustrated in the drawings, since any entrance-operating means and exit-operating means that is the equivalent of a lever might serve the same purpose and would be within the scope of my invention.

*The vote-counting mechanism.*—The counters 49, arranged in vertical columns, are rigidly secured to counter-bars 88, which have an endwise and lateral oscillatory movement in a vertical plane. The ends of the counter-bars are provided with bearings 89, which receive eccentrics 90 on eccentric-shafts 91, journaled in bearings 92 on brackets secured to the top and bottom of the case. Each eccentric-shaft is provided at one end, the left end, as seen in Figs. 2 and 3, with a miter-gear 93, which engages a miter-gear 94 on a vertical shaft 95, which is journaled in bearings at the top and bottom of the case. Operation of exit-lever 183 by means of connections presently to be described causes a complete forward rotation and then a return rotation of shaft 95, and consequently a forward rotation and return rotation of the two eccentric-shafts, the effect of which is to cause the counter-bars to make a complete endwise and lateral rotary oscillation in the vertical plane and then a return oscillation back to their normal position.

96 denotes vertical counter-locking bars journaled in bearings at the top and bottom of the case. In the present instance there are seven counter-locking bars corresponding with the seven vertical columns of names of candidates to be voted for and seven vertical columns of counters. Each counter-locking bar is provided with a series of transverse slots 97, thirty in the present instance, corresponding with the thirty individual levers, thirty horizontal lines of names of candidates, and thirty counters in each vertical column. The locking and unlocking movement of the counter-locking bars is oscillatory. In the normal or locking position each of the slots in each of the counter-locking bars receives the rearwardly-projecting end of one of the counter-levers 51. (See Figs. 8, 9, 14, and 15.) It will be understood, therefore, that before the counters can be operated by oscillation of eccentric-shafts 91 the counter-locking bars must be oscillated to release counter-levers 51. This operation is effected by exit-lever 183 in a manner presently to be explained. When an individual lever is operated either independently or in series by means of a party-lever, the corresponding counter-dog 44 is moved from its normal position, as shown in Fig. 8 and in full lines in Fig. 16, to the position shown in dotted lines in Fig. 16—that is, the counter-dog is swung to such a position that the pin 53, projecting from the outer side of the corresponding counter-lever 51, is placed in engagement with the hole 54 in the corresponding counter-dog 44.

In performing the operation of counting the point of engagement of each engaged pin 53 on a counter-lever 51 with a hole 54 in a counter-dog 44 becomes temporarily a center of rotation about which the counter-lever swings in the vertical plane. The pin is out of alinement with the projecting end of the counter-shaft 50, to which the counter-lever is rigidly secured. Suppose now that the oscillation of the counter-locking bars has commenced and that the counter-levers are released. The oscillation of the eccentric-shafts will cause the counter-bars to make a complete endwise and lateral oscillation in the vertical plane. As the pins on the counter-levers are held by the counter-dogs and the counters are carried by the counter-bars, it follows that each counter-shaft must make an axial rotation as the counter swings around in a circle of which the pin is the center. In other words, as the pins 53 are held against other than axial movement and as the counter-shafts to which the counter-levers are secured are caused to make a movement in a circle of which the point of engagement of the pin with the corresponding counter-dog is the center it follows that each counter-shaft must make a complete rotation on its own axis, and consequently an actuation will be imparted to the mechanism of each counter whose pin 53 is engaged by a counter-dog, and a vote will be registered by that counter. It has already been stated that this counting operation is performed through the operation of exit-lever 183 and after the operation of voting is completed. Another important action of the exit-lever, which will be again referred to, is the return thereby of the wedge-bars to their normal or locking position, which is completed just as the exit-lever reaches its fully-raised position. As the wedge-bars are moved to their normal or locking position the locking-lugs 45 on the individual-lever shafts ride up the inclines 77 of notches 48 in the wedge-bars, oscillate the individual-lever shafts, which carry the counter-dogs 44, and disengage the latter from the pins 53 on the counter-levers, leaving the counting mechanism again wholly disengaged from the voting mechanism and the voting-levers at their normal or non-voting position and locked there by the wedge-bars. The counting mechanism will also be locked against any possibility of interference or change by means of the counter-locking bars 96, which will have been returned to their normal position through the return movement of the exit-lever, and the rear ends of counter-levers 51 will have passed into the slots 97 in the counter-locking bars, thereby locking said levers against any movement whatever.

The oscillation of the counter-locking bars is effected as follows: Each counter-locking bar is provided at its lower end with a pinion 98, which engages a driving-rack 99. (See Figs. 3, 9, and 15.) Lying beside the driving-rack is the driving-bar 100, whose mode of operation through the operation of the exit-lever will presently be explained. The driving-bar is provided with a pin 101, which engages the slot 85 in the entrance-rack. (See Fig. 9 in connection with Fig. 3.) These views show the position of the parts before the operation of the entrance-lever, the effect of which is to move the entrance-rack toward the right from the position shown in Fig. 9, leaving a space between the entrance-rack and the driving-rack, the driving-rack and the driving-bar, however, remaining in the position shown—that is, their normal or extreme position toward the right. The miter-gear shaft 95 is provided with a pinion 82, (see Fig. 9,) which engages miter-gear-shaft rack 102. The miter-gear-shaft rack and the driving-rack are both operated from the driving-bar. There is a double connection between the driving-bar and the driving-rack, one connection serving also to lock the miter-gear-shaft rack to the driving-rack. There is also an additional connection of the miter-gear-shaft rack with the driving-rack. The first connection of the driving-bar with the driving-rack is by means of a pin 103, which extends from a block 104, passes through the driving-bar, and is adapted to engage a socket in the driving-rack. (See Fig. 3.) Upon the under side of block 104 is a roller which engages a cam-path 105 in a plate 106, secured to the base-plate of the machine. In the position shown in the drawings the driving-rack is locked to the driving-bar and will be moved thereby when the driving-bar is moved toward the left by the exit-lever. As the movement toward the left proceeds the roller travels down the incline of the cam-path, moves block 104 outward from the driving-bar, and withdraws pin 103 from engagement with the driving-rack. The other engagement of the driving-rack with the driving-bar is by means of a pin 107, which extends from a block 108, which is similar to block 103 and is provided on its under side with a roller which engages a reverse cam-path 109 in a plate 110, secured to the base-plate of the case. Pin 107 passes through a hole 111 in the driving-bar, through a horizontal slot 193 in the driving-rack, and engages a socket 112 in miter-gear-shaft rack 102. The miter-gear-shaft rack is also provided with a notch 113, which is engaged by a lug 114, projecting from the driving-rack, the lug being shorter than the notch, so as to permit slight movement of the driving-rack before the miter-gear-shaft rack is picked up thereby.

After the completion of the voting operation the driving-bar is moved toward the left, as seen in Figs. 3 and 9, by operation of the exit-lever and connections presently to be explained. When this movement commences, the driving-rack is connected to the driving-bar by pin 103, so that the driving-rack will commence to move with the driving-bar and will commence at once to oscillate the counter-locking bars, swinging them out of engagement with the counter-levers and leaving the counters free to be operated. An instant later lug 114 on the driving-rack will have traveled the length of notch 113 in the miter-gear-shaft rack and will commence to move said rack also toward the left, the effect of which will be to oscillate miter-gear shaft 95, which in turn by means of the eccentrics on eccentric-shaft 91 will produce the endwise and lateral rotary oscillation of the counter-bars in the vertical plane, which causes an actuation of each counter that has been connected to a counter-dog through the operation of an individual lever. During the movement of the driving-rack and miter-gear-shaft rack toward the left just described the roller on block 108 will ride up the incline of cam-path 109 and will force pin 107 forward into the socket 112 in the miter-gear-shaft rack, which prevents any possible backlash of the miter-gear-shaft rack through the weight of the counter-bars and counters. This engagement of pin 107 with the miter-gear-shaft rack continues until the end of the movement toward the left. During the latter part of the movement toward the left the roller on block 104 will ride down the incline of cam-path 105 and will withdraw pin 103 from engagement with the driving-rack. After this disengagement the driving-rack and the driving-bar being temporarily disconnected the driving-bar will continue its movement toward the left, the driving-rack and miter-gear-shaft rack remaining stationary while pin 107 is moving in slot 193 in the driving-rack. Another important operation performed by the driving-bar during the final portion of its movement toward the left is the drawing of the entrance-rack toward the left through the engagement of pin 101 on the entrance-bar with the left end of slot 85 in the entrance-rack, which by means of the connections already described moves the wedge-bars toward the left and locks the individual levers in the non-voting position through the engagement of locking-lugs 45 with the tops of the wedge-bars.

*Restricted voting.*—Suppose now that some kind of restricted voting is required to be performed by the machine. As for example, to permit a woman to vote upon a school question only or to prevent non-tax-payers on real estate from voting a full ticket, while permitting them to vote for candidates for certain offices. Restrictions of this character may be effected by mechanism which I will now describe.

115 (see Figs. 11 and 13) denotes a vertical restricting-bar which is rigidly secured, as by means of screws 116, to horizontal restricting-bars 62, of which there are thirty, corresponding with the thirty horizontal lines of names of condidates and individual levers. The vertical restricting-bar 115 and with it the horizontal restricting-bars 62 are operated by means of a restricting-handle 124, which extends through the end of the case and is connected to a vertical bar 118, which in turn is connected, by means of rods 117, with vertical restricting-bar 115. (See Figs. 2, 8, and 9.) Restricting-bars 62 are provided with notches 64, into which the locking-lugs 45 on the individual-lever shafts drop in normal voting, and also with bosses 125, which are adapted to pass under the locking-lugs 45 to prevent the individual-lever shafts engaged thereby from being oscillated—that is, to prevent the restricted voter from voting for any except the candidates for which he or she is allowed to vote. In setting up the machine for restricted voting the screws 116 in vertical restricting-bars 115 which correspond with the horizontal line or lines of names of candidates that the restricted voter is allowed to vote for are removed, leaving the corresponding horizontal restricting-bars 62 disconnected from vertical restricting-bar 115, so that when vertical bar 115 is operated by means of handle 124 all of the horizontal restricting-bars 62 that remain connected with vertical restricting-bar 115 will be moved horizontally toward the left, as seen in Figs. 1 and 13. This will place the bosses 125 on the connected horizontal restricting-bars under the locking-lugs 45 on the individual-lever shafts corresponding with the names of candidates for which the restricted voter is not allowed to vote and will lock said individual levers against operation. The horizontal restricting-bars 62, however, which are left disconnected from vertical bar 115 will remain in their normal or voting position—that is, a position in which the notches 64 in said disconnected horizontal restricting-bars will lie under the locking-lugs 45 on the individual-lever shafts, and will thus permit the restricted voter to vote in the usual manner.

*Independent voting.*—In order to give to voters ample opportunity to express their wishes at the polls unfettered by party nominations, I provide an independent-voting sheet 126, one end of which is connected to a receiving-roller 127, the unused portion being wound upon a supply-roller 128. (See Figs. 2, 3, 6, and 7.) These rollers are journaled in suitable bearings upon the top and bottom plates of the case. The receiving and supply rollers each carry a disk 86, upon which the coiled paper carried thereby rests. Intermediate the receiving and supply rollers is a backing-plate 87, secured to vertical rods 149, over which the paper passes and which provides a firm support for the paper while the voter writes the names of candidates he desires to vote for thereon. After an election the coil of paper upon the receiving-roller is severed from the supply-roller, and the votes thereon are counted in connection with the votes registered by the counters. The receiving-roller is driven by means of a voting-sheet rack 129, which is formed upon or rigidly secured to driving-bar 100. At the lower end of the receiving-roller is a one-toothed ratchet 130, which is engaged by a pawl 131, carried by a disk 132, having a central opening through which the receiving-roller passes loosely.

133 denotes a pinion which is fixed to the upper side of disk 132 and engages voting-sheet rack 129.

134 denotes a slide which moves in a guide 135, secured to the bottom plate of the case. 136 is a link which connects the slide with an arm 137, extending from an oscillating shaft 138, journaled in bearings in the top and bottom plates of the case. When this shaft is oscillated, as will presently be explained, arm 137 is moved from the position shown in Fig. 6 to the position shown in Fig. 7 and by means of the link moves slide 134 into engagement with a single tooth of ratchet 130, thereby locking said ratchet to the receiving-roller. When the driving-bar is moved toward the left by the upward movement of the exit-lever presently to be explained, pinion 133, which is engaged by the voting-sheet rack, and with it disk 132, will be turned forward, and through the engagement of the pawl with the ratchet forward movement will be imparted to the receiving-roller, which will wind a portion of independent-voting sheet 126 thereon and will place a fresh portion of said sheet in position on the backing-plate for more votes to be written thereon, as will presently be more fully explained. At the extreme of the movement of the driving-bar toward the left a cam 139 on the under side of disk 132 will pass between pawl 131 and the end of the plunger and will return the plunger-arm 137 and shaft 138 to their normal position, as clearly shown in Fig. 6, ready for the next operation.

140 (see Fig. 4) denotes a series of slides, each of which is provided with an aperture 141, and sliding in ways 171 back of each aperture is a shutter 142. The voting-sheet passes over the backing-plate and contiguous to these apertures, and when either of the apertures is opened by movement of a shutter toward the right, as seen in Fig. 1, or the left, as seen in Fig. 4, sufficient space upon the independent-voting strip will be disclosed to permit the voter to write thereon the name of a person not nominated as a candidate by either of the parties for whom he desires to vote, the shutters being arranged in a vertical column and corresponding substantially with the columns of voting-levers. Each shutter is provided with a finger-piece 143 for convenience in manipulation. All the shutters are shown in Fig. 1 in the closed position except the third and fourth from the top, which are shown in the open position, the finger-pieces being at the right, leaving the surface of the independent-voting sheet exposed through the aperture. The upper aperture and corresponding shutter are shown as made wider than the others in order that a plurality of names may be written thereon, as in casting an independent vote for Presidential electors. The machine, as shown in the drawings, is arranged to have the party votes for Presidential electors cast by single voting-levers. The vertical oscillatory shaft 138 is provided with pins 144, which extend through clearance-slots 145 in slides 140 and are adapted to be engaged by the rear ends of shutters 142 when the shutters are opened—that is, moved toward the left, as seen in Fig. 4. When any shutter is opened and the rear end thereof engages the corresponding pin 144, extending from shaft 138, said shaft will be oscillated thereby and will move arm 137, the link, and slide 134 from the position shown in Fig. 6 to the position shown in Fig. 7 and will place pawl 131 in engagement with the ratchet, so that when the exit-lever is operated the portion of the independent-voting sheet upon which votes have been written will be drawn out of alinement with the apertures and a fresh portion thereof will be placed in position to receive the votes of the next independent voter. 147 denotes a series of shutter-closing racks which reciprocate in ways 171 on slides 140. These racks are provided with slots 148 to provide clearance for pins 144. Shutter-closing racks 147 are operated by means of pinions 150, which also engage a vertical closing-rack 151, which reciprocates in suitable guides 146. (See Fig. 2 in connection with Fig. 4.) Vertical rack 151 is operated by means of a pinion 153 on a horizontal shaft 154, journaled in a bracket 155, secured to the base-plate of the case. At the other end of shaft 154 is a pinion 156, which engages a rack 157 on the driving-bar.

32 denotes a series of bell-crank levers pivoted on slides 140. There are thirty of these bell-crank levers corresponding with the thirty slides 140 and shutters 142. At the inner end of each chain 55—that is, the left end, as seen in Fig. 4—is a long link 165, which is pivoted to one arm of the corresponding bell-crank lever. The other arm of each bell-crank lever is pivoted to a link 152, the other end of which is pivoted to the corresponding slide 140. Each link 152 is provided with an incline 158, which is adapted to be engaged by an incline 159 on the corresponding shutter 142 to move the link 152 downward, which will tilt the bell-crank lever and take out the slack from the corresponding chain 55, thus locking the entire horizontal row of individual levers corresponding with that chain when the corresponding shutter is moved to the left, as seen in Fig. 4, or the right, as seen in Fig. 1, by a person who desires to vote independently instead of for a regular party nominee.

Chain-locking mechanism is provided which renders it impossible for a voter who has opened a shutter and taken the slack out of the corresponding chain by means of a bell-crank lever to operate any of the individual levers in that horizontal row, so that he can only cast a vote for the office to which that horizontal line is appropriated by writing it upon independent-voting sheet 126. When a chain 55 has been pulled taut—that is, had its slack taken out by the opening of one of the independent-vote shutters 142—the chain is locked to prevent the possible operation of any of the individual levers in that horizontal line by means of a latch 173, pivoted on fixed vertical plates 174, which are also provided with ways 121, which receive the long links 165 of the chains. (See Fig. 4ª in connection with Fig. 4.) These latches operate by gravity, the rear end of each latch being sufficiently heavy to cause the forward end to engage a locking-notch 172 in the corresponding long link 165 the instant said link is moved into position to place the locking-notch in alinement with the latch by the operation of a shutter.

175 denotes a vertical slide moving in suitable ways, (not shown,) which is provided with lugs 176, adapted to engage the rear ends of the latches. When the exit-lever is operated, slide 175 is moved upward by means of a cam 160, carried by a bar 162, extending from miter-gear-shaft rack 102. (See Figs. 9 and 10.) When the movement of the exit-lever takes place, cam 160 is moved toward the left from the position shown in Fig. 10 and engages a pin 163, which extends from the lower end of the vertical slide, lifts said slide, and through the engagement of the lugs with the rear ends of the latches lifts the rear ends of the latches upward, disengaging the forward ends thereof from locking-notches in the long links 165, with which they may have been engaged, thus leaving the chains unlocked again.

When a shutter 142 is moved to the open position for independent voting, the rear end of the shutter engages the corresponding pin 144 on shaft 138, as already stated, and moves slide 134 from the position shown in Fig. 6 to the position shown in Fig. 7 and places pawl 131 in engagement with ratchet 130 on receiving-roller 127, as already explained. The opening movement of each shutter is stopped by the engagement of its finger-piece 143 with the right end of aperture 141, as seen in Fig. 1. When the parts are in this position, a pin 164 at the rear end of the shutter will lie contiguous to the forward end of a lever 166, pivoted upon the forward end of the corresponding closing-rack 147. The rear end of this lever is heaviest, so as to hold it in the position shown, and normally rests upon the top of the lower way 171. When the exit-lever is operated, shutter-closing rack 147 is moved forward—that is, toward the right from the position shown in Fig. 4—and the forward end of lever 166 engages pin 164 on the shutter and moves the shutter to the closed position. As the shutter reaches the closed position the rear end of lever 166 will ride up an incline 167 on the lower way 171, which will lift the rear end of the lever and force the forward end downward and disengage it from pin 164. The slot 148 at the forward end of the shutter-closing rack is for clearance only and allows the shutter-closing rack to pass the corresponding pin 144 on shaft 138. The lever 166 is shown as pivoted to a bracket spanning the slot. The shutter-closing racks 147 are reciprocated by each actuation of the exit-lever. When none of the shutters 142 have been moved to the open position, no result is effected by the reciprocation of the shutter-closing racks unless the racks have been coupled for group voting, which will presently be described. The chains and slides are, in fact, connected up as a continuous part through the pivoting of the bell-crank levers to the slides. It will thus be seen that the chains act in independent voting, as well as in ordinary voting, to render it impossible to vote for but one candidate for any office. It should be noted that the slides remain stationary except in group voting.

*Group voting.*—The term "group voting" is used to designate any style of voting in which voters are permitted to vote for more than one candidate for the same office—as, for example, in voting for a plurality of members of a board, commission, court, or a delegation of two or more members. Suppose, as an illustration, that two justices of the supreme court are to be elected and that the several parties have each made two nominations for that office. In the present machine of the thirty horizontal lines of names of candidates the twelfth to the twenty-sixth lines, inclusive, are shown as adapted to group voting. The party-tickets would be so arranged as to bring the horizontal lines of candidates subject to group voting within these fifteen group-voting lines.

Turning now to Fig. 4, it will be borne in mind that the inner ends—that is, the left ends as seen in said figure—of the chains 55 are connected by means of intermediate parts already fully described in connection with the independent-voting mechanism with slides 140. The outer—that is, the right—end of each chain is provided with a double coupling-rack 56, which is adapted to reciprocate horizontally in a way 57 in end standard 59 (see Fig. 11) and is provided with a threaded adjusting-rod 58, which passes through the standard and receives an adjusting-nut 60. The outer—that is, the left—end of each slide 140, as seen in Fig. 4, is provided with a similar double coupling-rack 180. 181 denotes pinions journaled on studs projecting from the case, each pinion lying between two racks and engaging both racks, so as to normally hold the slides rigidly against movement.

The operation which is termed "coupling up" for group voting consists, essentially, in removing one or more of the pinions 181 from between coupling-racks 180, adjusting one or more of the coupling-racks 56 by means of the adjusting rods and nuts where more than two chains are to be coupled, and placing pinions 181 between coupling-racks 56 when necessary. If preferred, the studs on which the pinions are journaled may be made long enough to permit the pinions to be moved laterally thereon and placed out of engagement with the racks, but without removal from the machine. In the present instance two officers are to be elected, and each of the parties has placed two candidates in nomination for those offices. To couple up or arrange the machine for voting under the above conditions, the pinion 181 between the two slides 180 to be used would be left in place, but the pinions above the upper slide and below the lower slide would be removed, as at the left in Fig. 4, leaving said two slides free to reciprocate. The effect of removing the pinions 181 above and below the two slides 180 that are to be used, leaving a pinion 181 between them, is to make the two chains and corresponding slides operate as one continuous chain. Should the voter desire to vote for the two candidates nominated by either party, he would simply operate the proper individual levers in that party column. Should he desire to vote for any two candidates in the lower of the two horizontal lines of names of candidates whose chains are coupled, operation of the proper individual levers in that horizontal line would draw the upper rack 180 far enough toward the left, as seen in Fig. 4, to take the slack out of the upper chain and through engagement with the pinion 181 would move the lower rack 180 far enough toward the right to give to the lower chain in addition to its own slack the slack normally belonging to the upper chain, so that the lower chain would then have the additional amount of slack which would be necessary in order to permit the voter to operate two voting-levers in voting for two candidates in that horizontal line. Should the voter desire to vote for two candidates in the upper of the two horizontal lines in which the chains are coupled, the operation would be precisely the same, except that the slack would be taken out of the lower chain by movement toward the left of the lower slide 180 and would be transferred to the upper chain through the movement toward the right of the upper slide 180 by means of the pinion. Should the conditions be such as to permit the voter to vote for three candidates in a group, it would require the coupling of three chains and would necessarily require an adjustment of one of the adjusting-nuts, preferably the adjusting-nut corresponding with the middle or intermediate chain. It would also require that a pinion 181 be placed between the second and third coupling-racks 56 at the opposite ends of the chains. The upper chain would now be locked by the adjusting-nut on the adjusting-rod extending from the corresponding coupling-rack 56, the second coupling-rack 56 would be free to reciprocate longitudinally, and the third chain would be locked at its opposite end through the engagement of a pinion 181 with the corresponding coupling-rack 180 and the contiguous coupling-rack 180 below. To set up the machine for voting for three candidates in a group, the adjusting-nut on the adjusting-rod extending from one coupling-rack 56, preferably from the intermediate coupling-rack, would be loosened. Then three voting-levers in the corresponding line would be operated, thereby placing three bends or bulges in the corresponding chain, and then the adjusting-nuts corresponding with the three coupled chains would be tightened up, the effect of which would be to shorten the upper and lower chains by taking out the normal slack therefrom, leaving the intermediate chain with slack enough to permit three voting-levers to be operated. It should be understood, however, that owing to the interposition of a pinion 181 between the first and second coupling-racks 180 and the interposition of a pinion 181 between the second and third coupling-racks 56 the intermediate coupling-rack 56 would be free to reciprocate longitudinally, so that a voter would be free to express his choice by voting for one candidate in each of the three horizontal lines of names of candidates corresponding with the three coupled chains, or he might vote for three candidates in either of said three lines, or he might vote for two candidates in either of said three lines and for one candidate in either of the other two lines. In other words, the voter might vote for any one, two, or three of the candidates nominated in either of said three horizontal lines of names of candidates, but could only vote for three candidates under any circumstances. The same principle of operation and mode of setting up the machine is applicable where four, five, or more candidates are to be voted for in a group within the limits of the machine. If four candidates were to be voted for in a group, another chain would have to be added to the group of coupled chains. The pinion 181 between the third and fourth coupling-racks 180 would remain in place, but the pinion 181 between the fourth and fifth coupling-racks 180 would be removed, thus permitting the fourth coupling-rack 180 to reciprocate longitudinally. The adjusting-nuts on the adjusting-rods extending from certain of the coupling-racks 56, preferably from the second and third coupling-racks, would be loosened. Two voting-levers in the second line and two in the third line might then be operated, and the adjusting-nuts on the adjusting-rods extending from the second, third, and fourth coupling-racks 56 would then be tightened up. This would leave the first and fourth chains taut and the second and third chains each with two bends or bulges therein—that is to say, the first chain would remain shortened just sufficiently to take out its normal slack, and the fourth chain would be correspondingly shortened, while the second and third chains would each be correspondingly lengthened, so that there would be in the aggregate sufficient slack in the four chains to permit four voting-levers to be operated, any or all of which might be transferred to any of the chains, so that the voter might vote for four candidates in one line, or for one candidate in each of the four lines, or for two candidates each in any two lines, or for three candidates in one line and one in either of the other three lines, but could only vote for four candidates under any circumstances. This principle of grouping may be extended as far as the capacity of the machine will permit by removing certain of the pinions 181 from between the coupling-racks 180, interposing pinions 181 between certain of the coupling-racks 56 and adjusting certain of the coupling-racks 56 by means of the adjusting-nuts on the adjusting-rods extending therefrom, so as to give an aggregate amount of slack sufficient to permit the operation of the desired number of voting-levers; this for the reason that the effect of the coupling and adjustment just described is to cause the series of coupled chains by means of the pinions and racks to act as one continuous chain.

For group voting, where an alphabetical arrangement of the names of candidates is required, the racks and chains are not coupled—that is to say, none of the pinions 181 are removed. The chains corresponding with the horizontal lines of names of candidates in which group voting is permitted are so adjusted by means of the adjusting-rods and adjusting-nuts as to permit the depression of as many individual levers in a horizontal line as there are candidates that may be voted for in a group. Suppose, as an illustration, that three representatives are to be elected and that seven nominations have been made for the office of representative and that the voting law where the machine is used required that the names of the seven candidates be placed in alphabetical order from left to right in one horizontal line. All that it would be necessary to do in order to permit a voter to vote for any three of the seven candidates would be to so adjust the corresponding chain as to permit the depression of three individual levers in the corresponding horizontal line—in other words, to so adjust the corresponding chain as to permit three bends or bulges to be placed therein by the operation of three voting-levers. If two candidates for the same office were to be voted for, the chain would be slackened sufficiently to permit the operation of two voting-levers, but no more. Where three candidates are to be voted for, the voter is left free to vote for any one, two, or three of the seven candidates, but no more. It should be understood, however, that sufficient slack might be placed in the chain to permit a voter to vote for four, five, or, in fact, for all seven candidates, were such the requirement. This is merely mentioned to show the adaptability of the machine to any possible style of voting in which it might be desired to use a voting-machine.

Suppose now that a candidate is nominated for the same office by two or more political parties. In order to prevent a candidate who has been nominated by a plurality of parties from receiving as many votes from a single voter as he has nominations, I provide special mechanism, which is illustrated in Figs. 17 to 20, inclusive. The machine is so arranged as to place all the nominations of the plural nominee in one horizontal line. In that line the ordinary chain-supporting bar 52 is replaced by a bar 161, having recesses 169 in its upper edge. 170 denotes a sliding bar having recesses 177 and projections 178 upon its under edge. These projections 178 lie in recesses 169 in bar 161, the recesses being wider than the projections, so as to permit movement of bar 170. The long chain-rivets 63 rest upon the top of bar 161 between the recesses. Each voting-shaft in the specially-fitted plural-nomination lines is provided, in addition to its locking-lug 45, with a downwardly-extending arm 179, which lies back of the chain and is provided with a hole 182, adapted to receive a pin 195, which extends forward into the corresponding notch 177 in bar 170. In the normal position of the parts the projections 178 lie at the right end of recesses 169, and their movement when operated is toward the left, the arms 179 being close to the left end of said recesses, as seen in Figs. 18 and 19. It should be noted, however, that the distance between the sixth and seventh recesses 177 in bar 170 is shortened, so that the downwardly-extending arm 179 lies at the right end of the corresponding recess 177 instead of at the left end, as in the case of the first to the sixth recesses, inclusive. Suppose now that five or six party-tickets are in the field and the name of the same nominee for the same office appears on the second, third, and fifth party-tickets—that is, this name would appear in the second, third, and fifth columns of names of candidates. In such a case as this the counters corresponding with the second, third, and fifth voting-shafts would be removed and a pin 195 placed in the hole 182 in each of the corresponding arms 179 and also in the arm 179 belonging to the extreme right voting-shaft—in the present instance the seventh. Should a voter operate either the second, third, or fifth voting-shafts in casting his vote for the plural nominee—in the present instance the second voting-shaft—the pin 195 corresponding with that shaft would move the bar 170 toward the left and would operate the seventh voting-shaft also, whose counter has not been removed, thus connecting the corresponding counter-dog 44 with that counter. The movement of bar 170 toward the left would cease, however, before it could operate the other two voting-shafts corresponding to the other nominations of the plural candidate, so that the voter would not be misled into supposing that he had cast three votes for that nominee. Should he intentionally, however, depress either or both of the other two levers corresponding with the other nominations of that candidate, such illegal votes would not be counted, for the reason that his first vote would have made connection with the only counter available to the plural nominee. As to the other nominees in the same horizontal line, the counters corresponding with their voting-shafts are not removed nor are pins 195 inserted in the downwardly-extending arms 179 of their voting-shafts. Votes for these other candidates therefore remain unaffected by the special arrangements made to provide for the counting of a single vote only for a plural nominee. When the voting-shafts are returned to their normal position, in the manner already fully described, the engagement of the downwardly-extending arms 179 with the right ends of recesses 177 will return bar 170 to its normal position.

*The operation of the exit-lever.*—183 denotes the exit-lever which is rigidly secured to a shaft 184, journaled in a hub 196 at the end of the machine opposite to the entrance-lever—that is, the right end as seen from the front. 185 denotes a gear-wheel on shaft 184, which engages a pinion 186 on a short shaft 197, which carries a cam 187, having a cam-groove 188. This groove is engaged by a roller on a stud 189, (see Figs. 2 and 3,) which extends from driving-bar 100.

190 denotes a ratchet carried by shaft 184, which is engaged by a pawl 191 and in connection with suitable tripping mechanism (not shown, as the specific form of tripping mechanism is not of the essence of the present invention) prevents the return of the exit-lever to its normal or horizontal position until after it has been carried to the fully-raised position. I thus insure that a full movement will be imparted to the driving-bar and that a complete actuation will be imparted to the several mechanisms operated from the driving-bar.

After voting, the voter in order to pass out lifts the exit-lever from its normal position to substantially a vertical position. The instant the upward movement of the exit-lever commences driving-bar 100 will commence to move toward the left, as seen in Figs. 2 and 3, which of course would be toward the right if a person were facing the front of the machine. The first effects of this movement are to commence the oscillation of the counter-locking bars and move them out of engagement with the counter-levers, leaving the counters free to be operated, and to oscillate vertical closing-racks 151, which operate the shutter-closing racks 147. An instant later the oscillatory movement of counter-bars 88 commences. This movement is effected through the driving-bar 100, driving-rack 99, miter-gear-shaft rack 102, and the intermediate connections which oscillate the upper and lower eccentric-shafts 91 by which the vertical counter-bars 88 are carried. The oscillatory movement of the counter-bars, as already explained, causes an actuation of every counter whose counter-lever has been connected with the corresponding counter-dog by the operation of a voting-lever—that is, either by a party-lever or by the independent operation of an individual lever. The operative movement of the counter-bars is a complete endwise and lateral oscillation in the vertical plane and is completed before the end of the movement of the driving-bar toward the left. In this position the counter-bars remain stationary while the wedge-bars, which are actuated from the entrance-rack, which in turn receives its return actuation from the driving-bar, are moved to the locking position. As the wedge-bars approach the locking position the locking-lugs 45 on the individual-lever shafts 36 ride up the inclines 77 at the ends of notches 48 in the wedge-bars, whereby the individual-lever shafts are operated and the individual levers are swung to the normal or non-voting position, in which position they are locked by the engagement of the locking-lugs with the upper edges of the wedge-bars. This oscillation of the individual-lever shafts also acts to disengage the counter-dogs 44 that have been operated by the voting operation from the pins 53 that extend from the counter-levers. The movement of the wedge-bars is completed at the end of the upward movement of the exit-lever and the movement of the driving-bar toward the left. During the return movement of the exit-lever and the corresponding movement of the driving-bar toward the right—that is, toward its normal position—all of the parts which have been actuated from the driving-bar during its movement toward the left are returned to the normal or starting position, with the exception of the entrance-rack and wedge-bars, which are placed by the driving-bar in position to be operated by the next movement of the entrance-lever. During this return movement of the driving-bar the counter-bars by which the counters are carried make a return endwise and lateral rotary oscillation to the starting position. This return oscillation of the counter-bars is, however, without any function, it being merely a return movement to the normal position that does not affect the counters, for the reason that the counter-dogs have been previously disconnectd from the counter-levers. After the return oscillation of the counter-bars the counter-locking bars are returned to their normal position and again engage the counter-levers and lock the counters, so that they cannot be tampered with.

The operation by which a voter casts his vote by the use of this machine may be briefly described as follows: The voter passes along the back of the machine and operates and passes the entrance-lever. He then passes around to the front of the machine and casts his vote in the manner described by means of a party-lever, individual levers, or by writing his vote upon the independent-voting sheet. He then operates the exit-lever and passes out, it being impossible to return the exit-lever to its normal position until it has been fully operated. The voter should return the exit-lever to its normal position. If he does not do so, an attendant must do so, for the reason that through the connection of both the exit-lever and the entrance-lever with the same driving-bar the entrance-lever cannot be operated to unlock the voting-levers and to permit another voter to pass to the front of the machine until the exit-lever has been returned to its normal position, which, as already stated, locks the counters.

Having thus described my invention, I claim—

1. In a voting-machine, the combination with a flexible member mounted to have a predetermined amount of slack, of a series of voting members having projections movable toward and from said flexible member to take up the slack thereof, and a slide extending in proximity to said projections and having means engaging said projections and for positively resetting any voting member that has been actuated.

2. In a voting-machine, the combination with a flexible member mounted to have a predetermined amount of slack, of a series of voting members having projections movable toward and from said flexible member to take up the slack thereof, a slide extending in proximity to said projections and having means engaging said projections and for positively resetting any voting member that has been actuated, counters controlled by said voting members and means for regulating the slack in the flexible member, substantially as described, for the purpose specified.

3. In a voting-machine, the combination with a chain mounted to have a predetermined amount of slack and having each third link-rivet extending outward on opposite sides thereof and bars upon which said extended rivets rest, of a series of oscillatory voting members carrying projections engaging said chain to take up the slack thereof, counters and engaging connections on said counters and voting members.

4. In a voting-machine, the combination with a series of flexible members and a plurality of series of voting members carrying projections engaging the flexible members, for the purpose set forth, and counter-dogs, of counters adapted to be engaged by said counter-dogs, a party-bar having notches engaged by the projections on the voting members and means for actuating the party-bar.

5. In a voting-machine, the combination with a series of chains and a plurality of series of voting-shafts in alinement, each series of shafts corresponding with an office to be voted for and each shaft having a projection engaging one of the chains, of counters, engaging connections on the counters and voting-shafts, a series of party-bars having notches engaged by the projections, and means for actuating the party-bars to oscillate the voting-shafts.

6. In a voting-machine the combination with a series of chains, a plurality of series of voting-shafts in alinement, each series of shafts corresponding with an office to be voted for and each shaft carrying a locking-lug adapted to engage a chain and means for regulating the slack in the chains so that but one shaft corresponding with any chain can remain oscillated, of a series of party-bars corresponding with nominees of the parties and having notches which are engaged by said locking-lugs and means for actuating said party-bars to oscillate the locking-lugs engaged thereby.

7. In a voting-machine, the combination with a chain, a series of voting-shafts carrying projections engaging said chain and a resetting-slide engaging said projections, for the purpose set forth, of counters, engaging connections on said counters and voting-shafts and means independent of the voting-shafts for actuating the engaged counters.

8. In a voting-machine, the combination with a series of chains, a plurality of series of voting-shafts in alinement, each shaft carrying a voting-lever and a locking-lug adapted to engage the corresponding chain, and means for regulating the slack in the chains, for the purpose set forth, of a series of party-bars having notches which are engaged by the locking-lugs and means for actuating the party-bars and the corresponding voting-shafts and voting-levers.

9. In a voting-machine, the combination with a series of chains and a plurality of series of voting-shafts in alinement, each shaft carrying a projection engaging a chain and a counter-dog, of counters adapted to be engaged by the counter-dogs, a series of party-bars which are engaged by the projections, means for actuating the party-bars whereby the corresponding voting-shafts are actuated and means for returning the party-bars to their normal position leaving the voting-shafts controlled thereby in the voting position.

10. In a voting-machine, the combination with a chain and a series of voting-shafts carrying projections engaging said chain, for the purpose set forth, of a wedge-bar adapted to engage said projections to retain the voting-shafts in the non-voting position.

11. In a voting-machine the combination with a chain and a series of voting-shafts carrying locking-lugs engaging said chain, of a reciprocating wedge-bar having notches adapted to receive the locking-lugs when said wedge-bar is in the unlocking position and adapted to retain the locking-lugs in the non-voting position when said bar is in the locking position.

12. In a voting-machine the combination with a chain and a series of voting-shafts carrying locking-lugs engaging said chain, of a reciprocating wedge-bar having notches adapted to receive the locking-lugs when said wedge-bar is in the unlocking position and inclines up which said locking-lugs ride when the wedge-bar is moved to the locking position, whereby the voting-shafts are locked in the non-voting position.

13. In a voting-machine the combination with a chain and a series of voting-shafts carrying locking-lugs engaging said chain, of a reciprocating wedge-bar having notches adapted to receive the locking-lugs when the wedge-bar is in the unlocking position and inclines up which the locking-lugs ride when the wedge-bar is moved to the locking position, an entrance-lever and intermediate connections by which the wedge-bar is moved to the unlocking position.

14. In a voting-machine the combination with a chain and a series of voting-shafts carrying locking-lugs engaging said chain, of a reciprocating wedge-bar having notches adapted to receive the locking-lugs when the wedge-bar is in the unlocking position and inclines up which the locking-lugs ride when the wedge-bar is moved to the locking position, an entrance-lever and intermediate connections by which the wedge-bar is moved to the unlocking position and an exit-lever and intermediate connections by which the wedge-bar is returned to the locking position and the voting-shafts and locking-lugs to the non-voting position.

15. In a voting-machine the combination with a series of chains and a plurality of series of voting-shafts carrying locking-lugs engaging said chains, for the purpose set forth, of a plurality of reciprocating wedge-bars having notches to receive the locking-lugs when said wedge-bars are in the unlocking position and inclines up which the locking-lugs ride when the wedge-bars are moved to the locking position, a vertical bar connecting said wedge-bars whereby they are made to move together, an entrance-lever and intermediate connections whereby the wedge-bars are actuated.

16. In a voting-machine the combination with a series of chains and a plurality of series of voting-shafts carrying locking-lugs engaging said chains, for the purpose set forth, of a plurality of reciprocating wedge-bars having notches to receive the locking-lugs, one or more of said wedge-bars being provided with racks, a vertical bar connecting said wedge-bars, a vertical shaft having pinions engaging the racks, an entrance-lever and intermediate connections whereby said shaft is oscillated to move the wedge-bars to the unlocking position.

17. In a voting-machine the combination with a series of chains and a plurality of series of voting-shafts carrying locking-lugs engaging said chains, for the purpose set forth, of a plurality of reciprocating wedge-bars having notches to receive the locking-lugs, one or more of said wedge-bars, being provided with racks, a vertical bar connecting said wedge-bars, a vertical shaft having pinions engaging the racks, an entrance-lever and intermediate connections whereby said shaft is oscillated to move the wedge-bars to the unlocking position and an exit-lever and intermediate connections whereby said shaft is oscillated to return the wedge-bars to the locking position and the locking-lugs and voting-shafts to the non-voting position.

18. In a voting-machine the combination with a series of chains, a series of voting-shafts carrying locking-lugs engaging said chains, for the purpose set forth, and a series of reciprocating wedge-bars having locking-notches and inclines, for the purpose set forth, one or more of said wedge-bars being provided with racks, of a vertical bar by which said wedge-bars are connected, a vertical shaft having pinions engaging the rack, an entrance-rack and intermediate connections whereby said vertical shaft is oscillated, and an entrance-lever and intermediate connections whereby the entrance-rack is actuated.

19. In a voting-machine the combination with a series of chains, a series of voting-shafts carrying locking-lugs engaging said chains, for the purpose set forth, and a series of reciprocating wedge-bars having locking-notches and inclines, for the purpose set forth, one or more of said wedge-bars being provided with racks, of a vertical bar by which said wedge-bars are connected, a vertical shaft having pinions engaging the rack, an entrance-rack and intermediate connections whereby said vertical shaft is oscillated, an entrance-lever and intermediate connections whereby the entrance-rack is actuated to move the wedge-bars to the unlocking position and an exit-lever and intermediate connections whereby the entrance-rack is moved in the opposite direction and the wedge-bars are moved to the locking position.

20. In a voting-machine, the combination with a slack chain, means for adjusting the slack therein and a series of voting members carrying projections engaging the chain, of counter-dogs, counters having pins with which the counter-dogs engage when the voting members are actuated and means for retaining the voting members in the non-voting position.

21. In a voting-machine the combination with a series of chains having the rivet of each third link extending outward on each side thereof, a supporting-bar upon which one end of each extended rivet rests, and a restricting-bar on which the other end of each extended rivet rests, said restricting-bar being provided with notches and bosses, of a plurality of series of voting-shafts carrying locking-lugs engaging said chains, a vertical bar to which each restricting-bar is detachably connected and means for moving said vertical bar and the connected restricting-bars into and out of the restricting position, the notches in said restricting-bars being adapted to receive the locking-lugs and permit oscillation of voting-shafts in voting, and the bosses being adapted to engage the locking-lugs to lock said lugs and the voting-shafts in the non-voting position.

22. In a voting-machine the combination with a plurality of series of voting-shafts having locking-lugs extending therefrom, and restricting-bars having notches adapted to receive the locking-lugs in voting and bosses adapted to lock said lugs in the non-voting position, of a vertical bar to which said restricting-bars are connected and means for moving said vertical bar and the connected restricting-bars into the restricting position leaving the disconnected bars in position to permit restricted voting.

23. In a voting-machine, the combination with a series of chains and a plurality of series of voting-shafts carrying locking-lugs engaging the chains and counter-dogs, of counters having means for engagement by the counter-dogs, a series of party-bars having notches engaged by the locking-lugs and racks and party-shafts carrying pinions engaging said racks, substantially as described, for the purpose specified.

24. In a voting-machine, the combination with a series of chains and a plurality of series of voting members carrying projections engaging said chains, for the purpose set forth, of a series of party-bars which are engaged by the projections, means for actuating the party-bars and means for locking the voting members in the non-voting position.

25. In a voting-machine the combination with a series of chains and a plurality of series of individual-voting shafts carrying locking-lugs engaging said chains, for the purpose set forth, of a series of vertical party-bars having notches the upper ends of which are engaged by the locking-lugs and racks, party-shafts engaging said racks, party-levers on the party-shafts and weights whereby the party-shafts, party-levers and party-bars are returned to the non-voting position after voting a straight ticket leaving the corresponding individual-voting levers in the voting position.

26. In a voting-machine the combination with a series of chains, a plurality of series of individual-voting shafts carrying locking-lugs engaging said chains, means for adjusting said chains to allow sufficient slack in each chain to permit the oscillation of one only of the corresponding individual-voting levers, of a series of vertical party-bars which are engaged by the locking-lugs and party-levers and intermediate connections for actuating the party-bars in voting a straight ticket and tightening each chain, the actuation of an individual-voting lever in another column acting to cast an individual vote in another column and to cancel the corresponding vote previously cast and the actuation of another party-lever acting to cast a new straight party-vote and cancel all votes previously cast.

27. In a voting-machine the combination with a flexible member as a chain, and a series of voting-shafts carrying counter-dogs and projections engaging said flexible member, for the purpose set forth, of counters adapted to be engaged by the corresponding counter-dogs when in the voting position and mechanism for imparting rotary movement to the counters about the point of connection with counter-dogs whereby a vote is registered by an engaged counter.

28. In a voting-machine the combination with a chain and a series of voting-shafts carrying locking-lugs engaging said chain, for the purpose set forth, and counter-dogs, of counters having central shafts, levers carried by said shafts each having a pin extending therefrom out of alinement with the shaft and adapted to be engaged by the corresponding counter-dog and mechanism for imparting registering movement to the counters.

29. In a voting-machine the combination with a series of voting-shafts each carrying a counter-dog, of counters having central shafts, levers carried by said counter-shafts each having a pin extending therefrom out of alinement with the shaft and adapted to be engaged by the corresponding counter-dog and mechanism for imparting registering movement to the counters.

30. In a voting-machine, the combination with a series of voting-shafts carrying counter-dogs, of counters adapted to be engaged by counter-dogs when in voting position, and mechanism for imparting bodily rotary movement to the counters about their point of connection with their corresponding counter-dogs to register votes.

31. In a voting-machine, the combination with a series of voting-shafts each carrying a counter-dog, of counters adapted to be engaged by the corresponding counter-dogs when said dogs are in the voting position, mechanism for imparting bodily rotary movement to the counters and means for normally locking the counters against movement.

32. In a voting-machine the combination with a series of voting-shafts each carrying a counter-dog, of counters adapted to be engaged by the corresponding counter-dogs when said dogs are in the voting position, mechanism for imparting movement to the counters whereby a counter engaged by a counter-dog is caused to register a vote and oscillatory counter-locking bars which engage the counters and normally lock them against operation.

33. In a voting-machine the combination with a series of voting-shafts each carrying a counter-dog, of counters having central shafts, levers carried by said shafts each having a pin extending therefrom out of alinement with the shaft and adapted to be engaged by the corresponding counter-dog and oscillatory counter-locking bars provided with slots which are normally engaged by the counter-levers to lock the counters against operation.

34. In a voting-machine the combination with a series of voting-shafts each carrying a counter-dog, of counters adapted to be engaged by the corresponding counter-dogs when said dogs are in the voting position, counter-bars by which the counters are carried and means for imparting to said counter-bars endwise and lateral rotary oscillation whereby a counter engaged by a counter-dog is caused to register a vote.

35. In a voting-machine the combination with a series of voting-shafts each carrying a counter-dog, of counters adapted to be engaged by the corresponding counter-dogs when said dogs are in the voting position, counter-bars by which the counters are carried, eccentrics on which the ends of the counter-bars are mounted, and mechanism for oscillating said eccentrics, substantially as described for the purpose specified.

36. In a voting-machine the combination with a series of voting-shafts each carrying a counter-dog, of counters adapted to be engaged by the corresponding counter-dogs when said dogs are in the voting position, counter-bars by which the counters are carried, shafts carrying eccentrics on which the ends of the counter-bars are mounted, an exit-lever and intermediate connections whereby said shafts are oscillated.

37. In a voting-machine the combination with a series of voting-shafts each carrying a counter-dog, of counters adapted to be engaged by the corresponding counter-dogs when said dogs are in the voting position, counter-bars by which the counters are carried, counter-locking bars which engage the counters and normally lock them against operation, an exit-lever and intermediate connections whereby the counter-locking bars are caused to release the counters and the counter-bars have imparted thereto endwise and rotary oscillation whereby a counter engaged by a counter-dog is caused to register a vote.

38. In a voting-machine the combination with chains, a plurality of series of voting-shafts each carrying a counter-dog and a projection movable toward and from a chain, and slides engaging said projections for resetting voting-shafts that have been operated, of counters adapted to be engaged by the corresponding counter-dogs when said dogs are in the voting position, mechanism for normally locking the counters against operation, means for actuating said mechanism to unlock the counters, and mechanism for actuating the counters whereby each counter engaged by a counter-dog is caused to register a vote.

39. In a voting-machine the combination with chains, a plurality of series of voting-shafts each carrying a counter-dog and a projection movable toward and from the chain, and slides engaging said projections for resetting voting-shafts that have been operated, of counters adapted to be engaged by the corresponding counter-dogs when said dogs are in the voting position, mechanism for normally locking the counters against operation, an exit-lever and intermediate connections whereby the counter-locking mechanism is operated to release the counters and the counters are actuated causing each counter that is engaged by a counter-dog to register a vote.

40. In a voting-machine the combination with a series of chains, a plurality of series of voting-levers carrying locking-lugs engaging said chains and a series of counters controlled by said voting-levers, of bell-crank levers to which the chains are connected, an independent-voting sheet, sliding shutters contiguous to said sheet and intermediate connections whereby the opening of a shutter for independent voting will actuate a bell-crank lever, and tighten the corresponding chain, substantially as described for the purpose specified.

41. In a voting-machine the combination with a series of chains, a plurality of series of voting-levers carrying locking-lugs engaging said chains and a series of counters controlled by said voting-levers, of bell-crank levers to which the chains are connected, independent-voting shutters and intermediate connections whereby the opening of a shutter will actuate the corresponding bell-crank lever and straighten the chain and means for locking the chain so that when a shutter has been opened none of the corresponding voting-levers can be operated.

42. In a voting-machine the combination with a series of chains, a plurality of series of voting-levers carrying locking-lugs engaging said chains, and a series of counters controlled by said voting-levers, of bell-crank levers to which the chains are connected, independent voting-shutters having inclines, links having corresponding inclines and pivoted to the bell-crank lever whereby the opening of a shutter will actuate the corresponding bell-crank lever and straighten the chain, means for locking the chains and means for unlocking the chains and for returning opened shutters to the closed position.

43. In a voting-machine the combination with a chain, a series of voting-levers carrying locking-lugs engaging said chain, and a series of counters controlled by said voting-levers, of a bell-crank lever to which the chain is pivoted, a sliding shutter and connections intermediate said shutter and bell-crank lever, whereby when the shutter is opened the bell-crank lever is oscillated and the chain straightened and when the shutter is returned to the closed position the bell-crank lever is oscillated in the opposite direction, substantially as described for the purpose specified.

44. In a voting-machine the combination with a chain, a series of voting-levers carrying locking-lugs engaging said chain, for the purpose set forth, means for locking said chain when drawn inward and a series of counters controlled by said voting-levers of a bell-crank lever to which the chain is pivoted, a sliding shutter, connections intermediate said shutter and bell-crank lever, means for unlocking the chain and means for returning the shutter to the closed position and oscillating the bell-crank lever in the opposite direction.

45. In a voting-machine the combination with a chain having at its inner end a long link provided with a locking-notch, a series of voting-levers carrying locking-lugs engaging said chain, a bell-crank lever to which the chain is pivoted and a series of counters controlled by said voting-levers of a sliding shutter, connections intermediate said shutter and bell-crank lever whereby when the shutter is opened the bell-crank lever is oscillated and the chain drawn inward, a latch operating by gravity to engage the locking-notch and lock the chain, a vertical slide engaging said latch to release the chain and means for returning the shutter to the closed position.

46. In a voting-machine the combination with a chain having at its inner end a long link provided with a locking-notch, a series of voting-levers carrying locking-lugs engaging said chain, a bell-crank lever to which the chain is pivoted and a series of counters controlled by said voting-levers of a sliding shutter, connections intermediate said shutter and bell-crank lever whereby when the shutter is opened the bell-crank lever is oscillated and the chain drawn inward, a latch operating by gravity to engage the locking-notch and lock the chain, a vertical slide engaging said latch to release the chain, an exit-lever and intermediate connections whereby the slide is actuated and the chain released and the shutter is returned to its normal position.

47. In a voting-machine the combination with a chain having at its inner end a long link provided with a locking-notch, a series of voting-levers carrying locking-lugs engaging said chain, a bell-crank lever to which the chain is pivoted and a series of counters controlled by said voting-levers of a sliding shutter, connections intermediate said shutter and bell-crank lever whereby when the shutter is opened the bell-crank lever is oscillated and the chain drawn inward, a latch operating by gravity to engage the locking-notch and lock the chain, a vertical slide engaging said latch to release the chain and provided at its lower end with a pin, a cam adapted to engage the pin, an exit-lever and intermediate connections whereby the cam is caused to raise the slide and release the chain and the shutter is returned to its normal position.

48. In a voting-machine the combination with a chain, a series of voting-levers carrying locking-lugs engaging said chain, a bell-crank lever to which the chain is connected and a series of counters controlled by said voting-levers of an independent voting-shutter, engaging connections between said shutter and bell-crank lever whereby the opening of a shutter will oscillate the bell-crank lever and straighten the chain, means for locking said chain whereby operation of a voting-lever is rendered impossible, an independent-voting sheet, mechanism for actuating said sheet made operative by the opening of the shutter, an exit-lever, and intermediate connections whereby the chain is released, the shutter returned to the closed position and the independent-voting sheet is actuated.

49. In a voting-machine the combination with a chain, a series of voting-shafts carrying locking-lugs engaging said chain and a series of counters controlled by said voting-levers, of a bell-crank lever to which the chain is connected, a sliding shutter, engaging connections between said shutter and bell-crank lever, for the purpose set forth, an independent-voting sheet, mechanism for actuating said sheet made operative by the opening of the shutter and means for closing the shutter and for actuating the independent-voting sheet.

50. In a voting-machine the combination with a chain, a series of voting-levers carrying locking-lugs engaging said chain, a bell-crank lever to which the chain is connected and a series of counters controlled by said voting-levers of an independent-voting shutter, engaging connections between said shutter and bell-crank lever whereby the opening of a shutter will oscillate the bell-crank lever and straighten the chain, means for locking said chain whereby operation of a voting-lever is rendered impossible, an independent-voting sheet, a vertical shaft having a pin extending therefrom which is engaged by the shutter to oscillate the shaft when the shutter is opened, actuating mechanism for the independent-voting sheet which is made operative by the oscillation of the shaft, and operating mechanism whereby the chain is released, the shutter returned to the closed position and the independent-voting sheet is actuated.

51. In a voting-machine the combination with a chain, a series of voting-levers carrying locking-lugs engaging said chain, for the purpose set forth, a bell-crank lever to which the chain is connected and a series of counters controlled by said voting-levers, of an independent-voting shutter having a pin projecting therefrom, ways in which the shutter slides one of which is provided with an incline, engaging connections between the shutter and bell-crank lever whereby the opening of the shutter will oscillate the bell-crank lever and straighten the chain, means for locking the chain to prevent operation of a voting-lever, a shutter-closing slide and a lever pivoted thereto which is adapted to engage the pin to return the bell-crank lever to the closed position and which is tripped by the incline on the way at the end of the forward movement of the shutter-closing slide.

52. In a voting-machine the combination with a chain, a series of voting-levers carrying locking-lugs engaging said chain, for the purpose set forth, a bell-crank lever to which the chain is connected and a series of counters controlled by said voting-levers of an independent-voting shutter having a pin projecting therefrom, ways in which the shutter slides one of which is provided with an incline, engaging connections between the shutter and bell-crank lever whereby the opening of the shutter will oscillate the bell-crank lever and straighten the chain, means for locking the chain to prevent operation of a voting-lever, a shutter-closing slide, a lever pivoted thereto which is adapted to engage the pin to return the bell-crank lever to the closed position and which is tripped by the incline at the end of the forward movement, an exit-lever and intermediate connections whereby the shutter-closing slide is actuated.

53. In a voting-machine the combination with a series of chains having coupling-racks at their outer ends, means for adjusting the slack in said chains, and a plurality of series of voting-shafts carrying locking-lugs engaging said chains for the purpose set forth, of counters controlled by said voting-shafts, a series of slides having coupling-racks at their outer ends, bell-crank levers pivoted to the slides to which the chains are connected, means for normally retaining the bell-crank levers against movement, and pinions adapted to engage the coupling-racks on the chains and slides whereby said slides are normally locked and the chains and slides may be coupled for group voting substantially as described.

54. In a voting-machine the combination with a series of chains having coupling-racks at their outer ends, means for adjusting the slack in said chains and a plurality of series of voting-shafts carrying locking-lugs engaging said chains for the purpose set forth, of counters controlled by said voting-shafts, a series of slides to which the inner ends of the chains are connected and which are provided with coupling-racks at their outer ends and pinions adapted to engage said racks whereby the slides are normally locked and the chains and slides may be coupled for group voting substantially as described.

55. In a voting-machine the combination with a series of chains, coupling-racks at the opposite ends to which said chains are connected and means for adjusting the slack in said chains, of a plurality of series of voting-shafts carrying locking-lugs engaging said chains for the purpose set forth, counters controlled by said voting-shafts, and pinions intermediate said racks whereby a plurality of coupled chains are caused to operate as one continuous chain.

56. In a voting-machine the combination with a series of chains, coupling-racks at the opposite ends to which the chains are connected and means for adjusting the length of said chains so that the normal slack may be taken from certain of the chains and added to the normal slack in other chains, of a plurality of series of voting-shafts carrying locking-lugs engaging said chains for the purpose set forth, counters controlled by said voting-shafts, and pinions intermediate said racks whereby a plurality of coupled chains are caused to operate as one continuous chain.

57. In a voting-machine the combination with a series of chains having coupling-racks 56 at one end and coupling-racks 180 at the other end, and means for adjusting racks 56 to determine the slack of the chains, of a plurality of series of voting-shafts carrying locking-lugs engaging said chains for the purpose set forth, counters controlled by said voting-shafts, and pinions intermediate coupling-racks 180 which normally lock said racks and certain of which are adapted to be removed to release the coupled racks from the uncoupled racks, pinions being left between certain of the racks 180 to couple them and pinions being placed between certain of the racks 56 when more than two chains are to be coupled.

58. In a voting-machine the combination with a series of chains, coupling-racks at opposite ends to which the chains are connected and means for adjusting the slack in said chains, of a plurality of series of voting-shafts carrying locking-lugs engaging said chains, for the purpose set forth, and counter-dogs, coupling-pinions engaging said racks, for the purpose set forth, and counters normally disengaged from the counter-dogs but engaged thereby in the operation of voting.

59. In a voting-machine the combination with a series of chains, coupling-racks at opposite ends to which the chains are connected and means for adjusting the slack in said chains, of a plurality of series of voting-shafts carrying locking-lugs engaging said chains, for the purpose set forth, and counter-dogs, coupling-pinions engaging said racks, for the purpose set forth, counters normally disengaged from the counter-dogs but engaged thereby in the operation of voting, an exit-lever and intermediate connections whereby the engaged counters are operated and then the counter-dogs are disengaged therefrom.

60. In a voting-machine the combination with a series of chains, a plurality of series of voting-shafts carrying counter-dogs, locking-lugs engaging said chains and a bar for normally engaging and locking the locking-lugs, of an entrance-lever, intermediate connections whereby the locking-lugs are released, counters normally disengaged from the counter-dogs but engaged thereby by the operation of voting, an exit-lever and intermediate connections whereby the engaged counters are operated to register a vote and then released and the locking-lugs are again locked.

61. In a voting-machine the combination with a series of chains, a plurality of series of voting-shafts carrying locking-lugs engaging said chains, for the purpose set forth, and counter-dogs, and wedge-bars by which the locking-lugs are normally locked, of an entrance-lever, intermediate connections whereby the wedge-bar is operated to release the locking-lugs, counters normally disengaged from the counter-dogs but engaged thereby by the operation of voting, an exit-lever and intermediate connections whereby the engaged counters are operated to each register a vote and then released and the wedge-bar is returned to the locking position.

62. In a voting-machine the combination with a series of chains, a plurality of series of voting-shafts carrying locking-lugs engaging said chains, and wedge-bars by which the locking-lugs are normally locked out of operative position, of an entrance-lever, a cam oscillated thereby, an entrance-slide reciprocated by said cam, an entrance-rack actuated by the entrance-slide and intermediate connections by which the wedge-bars are moved to the unlocking position.

63. In a voting-machine the combination with a series of chains, a plurality of series of voting-shafts carrying locking-lugs engaging said chains, and wedge-bars by which the locking-lugs are normally locked out of operative position, of an entrance-lever, a cam oscillated thereby, an entrance-slide reciprocated by said cam, an entrance-rack actuated by the entrance-slide intermediate connections by which the wedge-bars are moved to the unlocking position, an exit-lever and intermediate connections by which the entrance-rack is returned to its normal position and the wedge-bars through intermediate connections are returned to the locking position.

64. In a voting-machine the combination with a series of chains, a plurality of series of voting-shafts carrying locking-lugs engaging said chains, and wedge-bars by which the locking-lugs are normally locked out of operative position, of an entrance-lever, a cam oscillated thereby, an entrance-slide reciprocated by said cam, an entrance-rack actuated by the entrance-slide, intermediate connections by which the wedge-bars are moved to the unlocking position, a driving-bar by which the entrance-rack is returned to its normal position and the wedge-bars through intermediate connections are returned to the locking position, an exit-lever and intermediate connections whereby the driving-bar is reciprocated.

65. In a voting-machine the combination with the chains, the voting-shafts carrying locking-lugs engaging the chains for the purpose set forth and wedge-bars by which the locking-lugs are normally locked out of operative position, of an entrance-lever, a cam oscillated thereby, an entrance-slide reciprocated by said cam and having a pin projecting therefrom, an entrance-rack having a slot one end of which is engaged by said pin, connections intermediate said rack and the wedge-bars by which said wedge-bars are moved to the unlocking position, a driving-bar having a pin engaging the slot in the entrance-rack, an exit-lever and intermediate connections whereby the driving-bar is reciprocated.

66. In a voting-machine the combination with the chains, the voting-shafts carrying locking-lugs engaging the chains for the purpose set forth and counter-dogs, counters normally disengaged from the counter-dogs but engaged thereby by the operation of voting, counter-bars by which the counters are carried, and counter-locking bars by which the counters are normally locked, of an exit-lever, a driving-bar, intermediate connections between the exit-lever and the driving-bar by which the latter is reciprocated and intermediate connections between the driving-bar and the counter-bars and the counter-locking bars by which the latter are oscillated to release the counters and the counter-bars are caused to make an endwise and lateral rotary oscillation by which the engaged counters are each caused to register a vote.

67. In a voting-machine the combination with the chains, the voting-shafts carrying locking-lugs engaging the chains, for the purpose set forth, and counter-dogs, wedge-bars by which the locking-lugs are normally locked out of operative position, an exit-lever and intermediate connections by which the wedge-bars are moved to the unlocking position, counters normally disengaged from the counter-dogs but engaged thereby by the operation of voting, counter-bars by which the counters are carried and counter-locking bars by which the counters are normally locked, of an exit-lever, a driving-bar, intermediate connections between the exit-lever and the driving-bar by which said bar is reciprocated, and intermediate connections between the driving-bar and the counter-bars, the counter-locking bars and the wedge-bars, whereby the counter-locking bars are oscillated to release the counters, the counter-bars are caused to make an endwise and lateral rotary oscillation by which the engaged counters are each caused to register a vote, and then the wedge-bars are caused to return the voting-shafts to their voting positions, lock the locking-lugs and release the counter-dogs from the counters, the counter-bars are caused to make a return oscillation and the counter-locking bars are caused to lock the counters.

68. In a voting-machine the combination with the chains, the voting-shafts carrying locking-lugs for the purpose set forth, and counter-dogs, counters normally disengaged from the counter-dogs but engaged thereby by the operation of voting and counter-bars by which the counters are carried, of shafts carrying eccentrics on which the counter-bars are mounted, a vertical shaft carrying a pinion, intermeshing connections on the vertical shaft and eccentric-shafts, a rack engaging the pinion, an exit-lever and intermediate connections whereby the eccentric-shafts are oscillated and the engaged counters are caused to register a vote.

69. In a voting-machine the combination with the chains, the voting-shafts carrying locking-lugs for the purpose set forth, and counter-dogs, counters normally disengaged from the counter-dogs but engaged thereby by the operation of voting and counter-bars by which the counters are carried, of eccentrics on which the counter-bars are mounted, an exit-lever and connections intermediate the exit-lever and the eccentrics whereby the counter-bars receive an endwise and lateral rotary oscillation, and the engaged counters are each caused to register a vote.

70. In a voting-machine the combination with the chains, the voting-shafts carrying locking-lugs for the purpose set forth and counter-dogs, counters normally disengaged from the counter-dogs but engaged thereby by the operation of voting, counter-bars by which the counters are carried and counter-locking bars which normally lock the counters, of an exit-lever and intermediate connections whereby the forward movement of said lever will oscillate the counter-locking bars and unlock the counters, oscillate the counter-bars and cause each engaged counter to register a vote and the return movement of said lever will return the counter-bars and counters to their normal position and cause the counter-locking bars to lock the counters.

71. In a voting-machine the combination with the chains, the voting-shafts carrying locking-lugs for the purpose set forth and counter-dogs, counters normally disengaged from the counter-dogs but engaged thereby by the operation of voting, wedge-bars by which the locking-lugs and counter-dogs are operated, counter-bars by which the counters are carried and counter-locking bars by which the counters are locked, of an exit-lever and intermediate connections whereby during the forward movement of said lever the counter-locking bars are oscillated and the counters unlocked, the counter-bars are oscillated and each engaged counter caused to register a vote and then the wedge-bars are caused to disengage the counter-dogs, the return movement of said lever causing a return movement of the counter-bars and counters and then a return movement of the counter-locking bars to lock the counters.

72. In a voting-machine the combination with the chains, the voting-shafts carrying locking-lugs and counter-dogs, the counters having means for engagement by said dogs, counter-locking-bars and wedge-bars by which the voting-shafts are locked, of an entrance-lever and intermediate connections by which the wedge-bars are moved to the unlocking position and an exit-lever and intermediate connections by which the counters are released, operated, disconnected and locked again.

73. In a voting-machine, the combination with voting mechanism, bodily-rotatable counters normally disconnected therefrom but connected therewith by the operation of voting, and counter-locking mechanism, of operating mechanism which unlocks the counters and bodily rotates the connected counters to actuate the same.

74. In a voting-machine the combination with voting devices and counters having counter-levers normally disconnected from the voting devices but connected therewith by the operation of voting, of counter-locking bars engaging the counter-levers to lock the counters independently of the voting devices, and operating means for releasing the counters and causing each connected counter to register a vote.

75. In a voting-machine the combination with voting devices and counters having counter-levers normally disconnected from the voting devices but connected therewith by the operation of voting, of counter-locking bars engaging the counter-levers to lock the counters independently of the voting devices, and operating means for releasing the counters, and causing each connected counter to register a vote and then disconnecting the connected counters.

76. In a voting-machine the combination with voting devices and counters having counter-levers normally disconnected from the voting devices but connected therewith by the operation of voting, of counter-locking bars engaging the counter-levers to lock the counters independently of the voting devices, and operating means for releasing the counters, causing each connected counter to register a vote, then disconnecting said counters and then locking the counters.

77. In a voting-machine the combination with the chains, the voting-shafts carrying locking-lugs and counter-dogs, wedge-bars by which the voting-shafts are locked and counters, said counter-dogs being normally disconnected from the counters but connected therewith by the operation of voting, of counter-locking mechanism, entrance operating means, whereby the wedge-bars are actuated to release the voting-shafts and exit operating means whereby the counters are released and the connected counters are each caused to register a vote.

78. In a voting-machine the combination with the chains, the voting-shafts carrying locking-lugs and counter-dogs and means whereby the voting-shafts are locked, of counters normally disconnected from the counter-dogs but connected therewith by the operation of voting, counter-locking mechanism engaging the counters independently of the counter-dogs, entrance operating means whereby the voting-shafts are released, and exit operating means whereby the counters are released and the connected counters are each caused to register a vote.

79. In a voting-machine the combination with voting mechanism and counters normally disconnected therefrom but connected therewith by the operation of voting, of counter-bars by which the counters are carried, shafts carrying eccentrics on which the counter-bars are mounted, the exit-lever, a driving-bar reciprocated thereby, a driving-rack reciprocated by the driving-bar, a rack 102 reciprocated by the driving-rack and intermediate connections whereby the eccentric-shafts are oscillated.

80. In a voting-machine the combination with voting mechanism and counters normally disconnected therefrom but connected therewith by the operation of voting, of counter-bars by which the counters are carried, the counter-locking bars, the exit-lever, a driving-bar reciprocated thereby and a driving-rack reciprocated by the driving-bar by which the counter-locking bars are oscillated.

81. In a voting-machine, the combination with voting-levers, counters having counter-levers normally disconnected from the voting-levers but connected therewith by the operation of voting, and counter-locking mechanism engaging the counter-levers independently of the voting-levers, of a driving-bar, connections intermediate the driving-bar and the counters, and exit operating means whereby the driving-bar is reciprocated, the counters are unlocked and the connected counters are each caused to register a vote and are then disconnected.

82. In a voting-machine the combination with voting-levers, counters having counter-levers disconnected from the voting-levers but connected therewith by the operation of voting and counter-locking bars engaging the counters to lock said counters independently of the voting-levers, of a driving-bar, connections intermediate the driving-bar and the counters and counter-locking bars and exit operating means whereby the driving-bar is reciprocated and the counters are released, the connected counters are each caused to register a vote, are then disconnected and then locked again.

83. In a voting-machine the combination with the chains, the voting-shafts, mechanism for locking the voting-shafts, counters normally disconnected from the voting-shafts but connected therewith by the operation of voting, and counter-locking mechanism for locking the counters independently of the voting mechanism, of a driving-bar, connections intermediate the driving-bar and the counters and counter-locking mechanism, entrance operating means which releases the voting-shafts, and exit operating means which reciprocates the driving-bar, releases the counters, causes each connected counter to register a vote and then disconnects the connected counters, locks the voting-shafts and then locks the counters.

84. In a voting-machine the combination with voting mechanism, counting mechanism and counter-locking mechanism, of a driving-bar, exit-operating means therefor, a driving-rack, a pin 103 carried by the driving-bar, mechanism for causing said pin to engage and disengage the driving-rack, a pin 107 carried by the driving-bar and passing through a slot in the entrance-rack, a rack 102 having a notch, a lug on the driving-rack engaging said notch but shorter than the notch to permit movement of the driving-rack before rack 102 is engaged, mechanism for causing pin 107 to engage and lock rack 102, and connections intermediate the driving-rack and the counter-locking mechanism and intermediate rack 102 and the counting mechanism.

85. In a voting-machine the combination with voting mechanism, counting mechanism and counter-locking mechanism, of a driving-bar, exit operating means therefor, a driving-rack, a pin 103 carried by the driving-bar, a block by which said pin is carried and which is provided with a roller, a cam-path engaged by the roller whereby the pin is caused to engage and disengage the driving-rack, a pin 107 carried by the driving-bar and passing through a slot in the driving-rack, a rack 102 having a notch, a lug on the driving-rack engaging said notch but shorter than the notch for the purpose set forth, a block by which pin 107 is carried and which is provided with a roller, a cam-path engaged by said roller whereby said pin is caused to engage and disengage rack 102 and connections intermediate the driving-rack and the counter-locking mechanism and intermediate rack 102 and the counting mechanism.

86. In a voting-machine the combination with voting mechanism, independent-voting mechanism, locking means for the voting and independent-voting mechanisms, counters having counter-levers normally disconnected from the voting mechanism but connected therewith by the operation of voting and counter-locking bars which normally lock the counters independently of the voting mechanism, of entrance operating means by which the voting and independent-voting mechanisms are released, and exit operating means by which the counting mechanism is released, operated and again locked and the voting and independent-voting mechanisms are again locked.

87. In a voting-machine the combination with voting mechanism, independent-voting mechanism, counters having counter-levers normally disconnected from the voting mechanism but connected therewith by the operation of voting and counter-locking bars which normally lock the counters independently of the voting mechanism, of exit operating means by which the counting mechanism is released, operated and again locked and the voting mechanisms are again locked.

88. In a voting-machine the combination with voting mechanism, independent-voting mechanism, independent-voting shutters, shutter-closing slides, counters, and counter-locking mechanism which normally locks the counters independently of the voting mechanism, of exit-operating means by which the counters are released, the counting mechanism is operated and the shutter-closing slides are returned to their normal position.

89. In a voting-machine the combination with voting mechanism, independent-voting mechanism, independent-voting shutters, shutter-closing slides, locking means for the voting mechanisms, counters having counter-levers normally disconnected from the voting mechanism but connected therewith by the operation of voting, and counter-locking bars which normally lock the counters independently of the voting mechanism, of entrance operating means by which the voting mechanisms are released and exit operating means by which the counting mechanism is released, operated and again locked, the shutter-closing slides are returned to their normal position and the voting mechanisms are again locked.

90. In a voting-machine the combination with the counter-dogs, counters adapted to be engaged thereby and counter-bars by which the counters are carried, of mechanism for imparting endwise and lateral rotary oscillation to the counter-bars whereby engaged counters are each caused to register a vote.

91. In a voting-machine the combination with the counter-dogs, counters adapted to be engaged thereby and counter-bars by which the counters are carried, of shafts carrying eccentrics on which the counter-bars are mounted and mechanism for imparting a forward and then a backward oscillation to said shafts and mechanism for disengaging the engaged counter-dogs before the return oscillation, substantially as described, for the purpose specified.

92. In a voting-machine the combination with the counter-dogs, counters adapted to be engaged thereby, counter-bars by which the counters are carried and counter-locking mechanism, of mechanism for releasing the counters, and mechanism for imparting endwise and lateral oscillation to the counter-bars, for the purpose set forth.

93. In a voting-machine the combination with the counter-dogs, counters adapted to be engaged thereby, counter-bars by which the counters are carried and counter-locking mechanism, of mechanism for releasing the counters, mechanism for imparting endwise and lateral rotary oscillation to the counter-bars, for the purpose set forth, mechanism for disengaging the counter-dogs and mechanism for relocking the counters.

94. In a voting-machine the combination with the counter-dogs, counters having counter-levers attached to their shafts which are adapted to be engaged by the counter-dogs and counter-locking bars having slots which receive the counter-levers to lock the counters, of mechanism for oscillating the counter-locking bars to release the counters and mechanism for imparting endwise and lateral rotary oscillation to the counter-bars whereby the engaged counters are each caused to register a vote.

95. In a voting-machine the combination with voting-levers, counters having counter-levers, counter-locking bars operative to lock the counters independently of the counter-levers, an entrance-lever and an exit-lever, of unlocking mechanism for the voting-levers actuated by the entrance-lever, and counter-releasing, operating and locking mechanism actuated by the exit-lever.

96. In a voting-machine the combination with voting mechanism, counting mechanism, an entrance-lever and an exit-lever, of an entrance-slide operated by the entrance-lever, an entrance-rack moved in one direction by the entrance-slide, a driving-bar reciprocated by the exit-lever and a driving-rack reciprocated by the driving-bar, which also returns the entrance-rack to position to be again operated by the driving-bar.

97. In a voting-machine the combination with voting mechanism, counting mechanism, an entrance-lever and an exit-lever, of a driving-bar reciprocated by the exit-lever, connections intermediate the driving-bar and the operative parts of the machine, an entrance-rack for locking and unlocking the voting mechanism and an entrance-slide operated by the entrance-lever which is adapted to engage the entrance-rack and move it in one direction, said entrance-rack being engaged by the driving-bar to move it in the opposite direction.

98. In a voting-machine the combination with the chains, the voting-shafts and means for locking the voting-shafts, of counters normally disconnected from the voting-shafts but connected therewith by the operation of voting, means for locking the counters independently of the voting-shafts, a driving-bar and intermediate connections by which the counters are unlocked and operated, and exit operating means for the driving-bar.

99. In a voting-machine the combination with the chains, the voting-shafts and the counters normally disconnected therefrom but connected therewith by the operation of voting, of a driving-bar and intermediate connections by which the counters are operated, an entrance-slide and an entrance-rack and intermediate connections by which the voting-shafts are locked and unlocked, said entrance-rack being moved in one direction to unlock the voting-shafts by the entrance-slide and in the opposite direction to lock the voting-shafts by the driving-bar.

100. In a voting-machine, the combination with the chains, the voting-shafts, and counters having counter-levers, of mechanism for locking and unlocking the voting-shafts, counter-locking bars engaging said levers to lock the counters independently of the voting-shafts, an entrance-lever and intermediate connections by which the voting-shafts are unlocked, and an exit-lever and intermediate connections whereby the counters are unlocked, operated and relocked and the voting-shafts are locked.

101. In a voting-machine, the combination with voting mechanism, counters having counter-levers and counter-locking bars engaging the counter-levers to lock the counters independently of the voting mechanism, of entrance operating means by which the voting mechanism is unlocked, and exit operating means by which the counters are released, operated and locked and the voting mechanism is locked.

102. In a voting-machine, the combination with voting mechanism, locking mechanism therefor, counters having counter-levers normally disconnected from the voting mechanism but connected therewith by the operation of voting and locking-bars engaging the counters to lock said counters independently of the voting mechanism, of entrance operating means by which the voting mechanism is unlocked and exit operating means by which the counting mechanism is unlocked, operated and relocked, and the voting mechanism is locked.

103. In a voting-machine the combination with voting mechanism, counting mechanism, an entrance-lever and an exit-lever, of an entrance-rack moved in one direction by the entrance-lever to make the voting mechanism operative, a driving-bar reciprocated by the exit-lever and intermediate connections by which the counting mechanism is unlocked, operated and relocked and the entrance-rack is moved in the opposite direction to make the voting mechanism inoperative.

104. In a voting-machine the combination with the chains, the voting-shafts carrying locking-lugs and counter-dogs and the wedge-bars by which the locking-lugs are engaged and the voting-shafts locked, of counters adapted to be engaged by the counter-dogs, an entrance-lever and intermediate connections by which the wedge-bars are operated to release the voting-levers and an exit-lever and intermediate connections by which the engaged counters are operated and the wedge-bars returned to their normal position to lock the counter-levers.

105. In a voting-machine the combination with the chains, the voting-shafts, carrying locking-lugs and counter-dogs and the wedge bars by which the locking-lugs are engaged and the voting-shafts locked, of counters adapted to be engaged by the counter-dogs, counter-locking mechanism, an entrance-lever and intermediate connections by which the wedge-bars are operated to release the voting-levers and an exit-lever and intermediate connections by which the counters are unlocked, operated and relocked and the wedge-bars are returned to their normal position to lock the voting-shafts.

106. The combination of the entrance-lever, a shaft fixed thereto, a grooved cam fast upon said shaft, a pin-provided bar connected to said cam, a slotted sliding rack connected to said bar, a gear-provided shaft engaged by said rack, a pinion-provided shaft engaged with said gear-shaft and a rack-provided and recessed sliding bar engaged with said pinion-provided shaft, all substantially as described for the purpose of unlocking the voting-levers of a voting-machine by the lifting of said entrance-lever.

107. The combination of the exit-lever, a shaft fixed thereto, a gear upon said shaft, a pinion-provided shaft engaged with said gear, a grooved cam fast upon the pinion-provided shaft, a driving-bar engaged with said cam and having a pin at the other end thereof, a slotted entrance-rack engaged with said pin, a gear-provided shaft engaged with said rack, a pinion-provided shaft engaged with said gear-shaft and a rack-provided sliding bar engaged with said pinion-provided shaft, all substantially as described for the purpose of locking the voting-levers of a voting-machine by operation of the exit-lever.

108. The combination of the exit-lever, a shaft fixed thereto, a gear upon said shaft, a pinion-provided shaft engaged with said gear, a grooved cam upon said pinion-provided shaft, a driving-bar engaged with said cam, a sliding rack attached to said bar and a counter-locking bar having recesses and a pinion meshed with said rack, all substantially as described, for the purpose of unlocking and relocking the counters of a voting-machine.

109. The combination of a voting-shaft having a counter-dog with a hole, a counter, a counter-lever fixed to the shaft of said counter and having a pin adapted to engage the hole in the counter-dog, a counter-bar by which the counter is carried, shafts provided with eccentrics on which the counter-bar is mounted, a shaft having gears intermeshing with gears on the eccentric-shafts, a sliding rack engaged with said shaft, a driving-bar engaged with said rack, a cam-provided and pinion-provided shaft engaged with said bar, a gear-provided shaft engaged with said cam-shaft and the exit-lever fixed to said gear-shaft, all substantially as set forth for the purpose of operating said counter in the registration of a vote.

110. The combination of a counter, a counter-lever fixed to the shaft of said counter and having a pin extending therefrom, a counter-dog having a hole adapted to receive said pin, a counter-bar by which the counter is carried, a pair of horizontal and gear-provided eccentric-shafts upon which the counter-bar is mounted, and suitable means for simultaneously rotating said eccentric-shafts, all substantially as set forth, for the purpose of operating said counter in the registration of a vote.

111. The combination of the herein-described exit-lever, a gear-provided shaft fixed thereto, a pinion-provided shaft engaged by said gear-shaft, a grooved cam fixed to said pinion-shaft, a driving-bar engaged with said cam, a sliding rack attached to said driving-bar, a cam-provided bar fast on said sliding rack and a vertical lug-provided sliding bar having a pin engaging said cam, all substantially as described for the purpose of raising and lowering said lug-provided sliding bar at the close of a voting operation.

112. The combination of the exit-lever, a gear-provided shaft fixed thereto, a pinion-provided shaft engaged with said gear-shaft, a grooved cam fast upon the pinion-shaft, a driving-bar engaged with said cam, a rack upon the top of the drive-bar, a pinion-provided shaft engaged with said rack, a vertical sliding rack engaged with said pinion-provided shaft, a series of pinions engaged with said sliding rack and a set of shutter-closing racks engaged with said pinions, all substantially as described, for closing opened independent-voting shutters.

113. The combination of the herein-described machine-base having cam-paths formed therein, a driving-bar having a pair of pins carrying rollers engaged with said cam-paths, a slotted driving-rack detachably connected with said driving-bar, and a slotted sliding rack 102 loosely connected with said driving-rack, all substantially as described for the purpose of regulating the cooperative movement of said bar and racks in the operation of a voting-machine.

114. The combination of the exit-lever, a gear-provided shaft fixed thereto, a pinion-provided shaft engaged with said gear-shaft, a grooved cam upon said pinion-shaft, a two-pin-provided driving-bar engaged with said cam, a slotted driving-rack detachably connected to the drive-bar, a rack 102 loosely connected with the driving-rack and cam-paths engaged by the pins carried by the drive-bar, all substantially as described, for the purpose of operating a voting-machine by movement of said exit-lever.

115. The combination of the entrance-lever, a cam-provided shaft fixed thereto, the entrance-slide engaged with said shaft, the slotted sliding rack engaged with said bar, the gear-provided shaft engaged with said rack, the pinion-provided shaft engaged with said gear-shaft, the set of sliding and rack-provided wedge-bars engaged with said pinion-shaft, the set of voting-shafts having locking-lugs engaged with said wedge-bars, the set of end-supported and intermediately-supported slackened chains beneath said voting-shafts, the driving-bar engaged with the sliding rack, the cam-provided shaft engaged with said drive-bar, the gear-provided shaft engaged with said cam-shaft and the exit-lever fixed to said gear-shaft, all substantially as described for the purpose of providing voting-shafts capable of becoming locked, unlocked and interlocked in the various operations of the machine.

116. The combination of the entrance-lever, the cam-provided shaft fixed thereto, the entrance-slide engaged with said shaft, the slotted sliding rack engaged with said slide, the gear-provided shaft engaged with said rack, the pinion-provided shaft engaged with said gear-shaft, the sliding and rack-provided wedge-bars engaged with said pinion-shaft, the voting-shafts carrying locking-lugs engaged with said wedge-bars, the end-rack-provided and intermediately-supported chains beneath the voting-shafts, the adjusting-nuts on the end racks of said chain, a suitable vertical bearing for said nuts, pinions engaged with the end racks of said chains, the driving-bar engaged with the slotted sliding rack, the cam-provided shaft engaged with said driving-bar, the gear-provided shaft engaged with said cam-shaft and the exit-lever fixed to said gear-shaft, all substantially as described for the purpose of providing lockable, unlockable and interlockable voting-shafts in the operation of group voting.

117. The combination of the entrance-lever, the cam-provided shaft fixed thereto, the entrance-slide engaged with said shaft, the entrance-rack engaged with said slide, the gear-provided shaft engaged with said rack, the pinion-provided shaft engaged with said gear-shaft, the sliding and rack-provided wedge-bars engaged with the pinion-shafts, the voting-shafts carrying locking-lugs engaged by the wedge-bars, the end-supported and intermediately-supported chains beneath the voting-shafts, the fixed and recessed bars in front of said chains, the recessed and straight-edged sliding bars fitted to said fixed bars, the detachable pins fitted to the arms of the voting-levers, the driving-bar engaged with the slotted sliding rack, the cam-provided shaft engaged with the driving-bar, the gear-provided shaft engaged with the cam-shaft and the exit-lever fixed to said gear-shaft, all substantially as described for the purpose of providing lockable, unlockable and interlockable voting-shafts in the operation of double-nomination voting.

118. The combination of the entrance-lever, the cam-provided shaft fixed thereto, the entrance-slide engaged with said shaft, the slotted entrance-rack engaged with said slide, the gear-provided shaft engaged with said rack, the pinion-provided shaft engaged with said gear-shaft, the sliding and rack-provided wedge-bars engaged with said pinion-shaft, the voting-shafts carrying locking-lugs engaged by said wedge-bars, the end-supported and intermediately-supported chains beneath the voting-shafts, the notched links at one end of said pins, the bell-crank levers engaged with said links, the depressible links connected to said bell-crank levers, the pivoted latches engaging the notched chain-links, the driving-bar engaged with the slotted entrance-rack, the cam-provided shaft engaged with the driving-bar, the gear-provided shaft engaged with the cam-shaft and the exit-lever fixed to the gear-shaft, all substantially as described, for the purpose of providing lockable, unlockable and interlockable voting-shafts in a machine adapted to independent voting.

In testimony whereof I have signed my name to this specification in presence of two subscribing witnesses.

WILSON L. FENN.

Witnesses:
 JOSEPH MERRITT,
 JOHN W. CONWAY.